United States Patent
Sun et al.

(10) Patent No.: US 11,218,261 B2
(45) Date of Patent: Jan. 4, 2022

(54) CHANNEL STATE INFORMATION REFERENCE SIGNALS IN CONTENTION-BASED SPECTRUM

(71) Applicant: QUALCOMM Incorporated, San Diego, CA (US)

(72) Inventors: Jing Sun, San Diego, CA (US); Taesang Yoo, Riverside, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/161,600

(22) Filed: May 23, 2016

(65) Prior Publication Data

US 2016/0352482 A1     Dec. 1, 2016

Related U.S. Application Data

(60) Provisional application No. 62/169,418, filed on Jun. 1, 2015.

(51) Int. Cl.
| | |
|---|---|
| *H04L 5/00* | (2006.01) |
| *H04W 72/04* | (2009.01) |
| *H04L 27/00* | (2006.01) |

(52) U.S. Cl.
CPC .......... *H04L 5/0048* (2013.01); *H04L 5/0057* (2013.01); *H04L 5/0091* (2013.01); *H04W 72/042* (2013.01); *H04L 27/0006* (2013.01)

(58) Field of Classification Search
None
See application file for complete search history.

(56) References Cited

U.S. PATENT DOCUMENTS

| | | | |
|---|---|---|---|
| 2012/0020272 A1* | 1/2012 | Lee | ................. H04L 5/0048 370/312 |
| 2012/0113961 A1 | 5/2012 | Krishnamurthy | |
| | | (Continued) | |

FOREIGN PATENT DOCUMENTS

| | | |
|---|---|---|
| CN | 102291213 A | 12/2011 |
| CN | 104584625 A | 4/2015 |
| | (Continued) | |

OTHER PUBLICATIONS

ISA/EP, International Search Report and Written Opinion of the International Searching Authority, Int'l Application No. PCT/US2016/033953, dated Nov. 7, 2016, European Patent Office, Rijswijk, NL, 20 pgs.

(Continued)

*Primary Examiner* — Gregory B Sefcheck
*Assistant Examiner* — Suk Jin Kang
(74) *Attorney, Agent, or Firm* — Holland & Hart LLP

(57) ABSTRACT

Methods, systems, and devices for wireless communication are described, which may be employed for wireless communication in contention-based (e.g., unlicensed or shared) spectrum. An aperiodic channel state information (CSI) reference signals (RS) may be used for channel quality indicator (CQI) measurements, for example. A user equipment (UE) may receive signaling to indicate the presence of CSI RS and may receive the CSI RS according to the signaling. The UE may then compute a CQI based on CSI RS, and transmit the CQI in a report to a base station. In some examples, a quasi-periodic CSI RS is used. For instance, the UE may determine a different location for the CSI RS. For example, the UE may identify a periodic anchor subframe, and locate the CSI RS based on constant offset from the anchor subframe. Periodic or a clear-channel- (Continued)

assessment-exempt transmission based CSI RS examples are also described.

29 Claims, 22 Drawing Sheets

(56) References Cited

U.S. PATENT DOCUMENTS

| | | | | |
|---|---|---|---|---|
| 2012/0155414 A1* | 6/2012 | Noh | H04B 7/0417 | 370/329 |
| 2012/0250558 A1* | 10/2012 | Chung | H04L 1/0026 | 370/252 |
| 2013/0107832 A1* | 5/2013 | Kim | H04B 7/024 | 370/329 |
| 2013/0196675 A1* | 8/2013 | Xiao | H04W 72/082 | 455/452.1 |
| 2013/0242902 A1* | 9/2013 | Liu | H04W 24/10 | 370/329 |
| 2014/0003240 A1* | 1/2014 | Chen | H04L 5/14 | 370/235 |
| 2014/0192917 A1* | 7/2014 | Nam | H04B 7/0417 | 375/267 |
| 2014/0219162 A1* | 8/2014 | Eyuboglu | H04W 16/26 | 370/315 |
| 2014/0315563 A1* | 10/2014 | Guo | H04L 1/0026 | 455/450 |
| 2014/0321313 A1* | 10/2014 | Seo | H04J 11/00 | 370/252 |
| 2015/0055588 A1* | 2/2015 | Yerramalli | H04L 5/005 | 370/329 |
| 2015/0063177 A1* | 3/2015 | Kim | H04B 7/024 | 370/280 |
| 2015/0103801 A1* | 4/2015 | Nam | H04L 5/0016 | 370/330 |
| 2015/0124731 A1* | 5/2015 | Tsuboi | H04W 24/10 | 370/329 |
| 2015/0171948 A1* | 6/2015 | Xiao | H04W 72/082 | 370/252 |
| 2015/0249511 A1* | 9/2015 | Chen | H04L 1/0026 | 370/252 |
| 2015/0365152 A1* | 12/2015 | Frenne | H04L 27/0006 | 370/252 |
| 2015/0373674 A1* | 12/2015 | Han | H04W 16/14 | 370/329 |
| 2016/0044650 A1* | 2/2016 | Enescu | H04W 72/0406 | 370/329 |
| 2016/0050006 A1* | 2/2016 | Ko | H04B 17/00 | 370/329 |
| 2016/0050050 A1* | 2/2016 | Kang | H04B 7/0617 | 370/329 |
| 2016/0127936 A1* | 5/2016 | Chatterjee | H04B 7/0626 | 370/252 |
| 2016/0143055 A1* | 5/2016 | Nammi | H04W 74/006 | 370/329 |
| 2016/0173217 A1* | 6/2016 | Sano | H04W 72/082 | 370/329 |
| 2016/0174235 A1* | 6/2016 | Fong | H04B 7/024 | 370/329 |
| 2016/0183263 A1* | 6/2016 | Liu | H04W 24/02 | 370/329 |
| 2016/0197715 A1* | 7/2016 | Papasakellariou | H04L 5/1469 | 370/329 |
| 2016/0227425 A1* | 8/2016 | Kim | H04L 5/0007 | |
| 2016/0227428 A1* | 8/2016 | Novlan | H04W 24/10 | |
| 2016/0227519 A1* | 8/2016 | Nimbalker | H04L 5/001 | |
| 2016/0227548 A1* | 8/2016 | Nimbalker | H04L 5/0048 | |
| 2016/0277954 A1* | 9/2016 | Frenne | H04B 7/0626 | |
| 2016/0360437 A1* | 12/2016 | Larsson | H04W 24/10 | |
| 2017/0005744 A1* | 1/2017 | Li | H04W 72/082 | |
| 2017/0063503 A1* | 3/2017 | Liu | H04L 5/0048 | |
| 2017/0078062 A1* | 3/2017 | Park | H04B 7/26 | |
| 2017/0149484 A1* | 5/2017 | Nimbalker | H04W 72/042 | |
| 2017/0150427 A1* | 5/2017 | Cheng | H04W 48/16 | |
| 2017/0164226 A1* | 6/2017 | Wei | H04W 24/10 | |
| 2017/0164301 A1* | 6/2017 | Jeon | H04W 52/243 | |
| 2017/0195017 A1* | 7/2017 | Kim | H04B 7/0639 | |
| 2017/0195031 A1* | 7/2017 | Onggosanusi | H04B 7/0626 | |
| 2017/0237478 A1* | 8/2017 | Kwak | H04B 7/0626 | 370/329 |
| 2017/0238323 A1* | 8/2017 | Marinier | H04W 72/06 | 370/329 |
| 2017/0244461 A1* | 8/2017 | Hammarwall | H04W 24/02 | |
| 2017/0244533 A1* | 8/2017 | Onggosanusi | H04L 5/0057 | |
| 2017/0250787 A1* | 8/2017 | Geirhofer | H04L 5/0051 | |
| 2017/0280331 A1* | 9/2017 | Gou | H04L 5/0007 | |
| 2017/0289825 A1* | 10/2017 | Harrison | H04L 1/0026 | |
| 2017/0289902 A1* | 10/2017 | Mochizuki | H04W 48/16 | |
| 2017/0294998 A1* | 10/2017 | Etemad | H04L 5/0035 | |
| 2017/0302312 A1* | 10/2017 | Guan | H04W 16/10 | |
| 2017/0318568 A1* | 11/2017 | Nimbalker | H04L 5/0094 | |
| 2017/0353866 A1* | 12/2017 | Gou | H04L 5/0007 | |
| 2017/0359803 A1* | 12/2017 | Guo | H04W 72/0413 | |
| 2017/0359811 A1* | 12/2017 | Yamada | H04W 72/046 | |
| 2017/0366316 A1* | 12/2017 | Kim | H04B 7/0417 | |
| 2018/0007576 A1* | 1/2018 | Lee | H04W 24/10 | |
| 2018/0070375 A1* | 3/2018 | Xu | H04L 5/0091 | |
| 2018/0084502 A1* | 3/2018 | Choi | H04B 7/06 | |
| 2018/0102817 A1* | 4/2018 | Park | H04L 5/001 | |
| 2018/0176809 A1* | 6/2018 | Gao | H04L 5/0057 | |
| 2018/0199369 A1* | 7/2018 | Larsson | H04W 72/14 | |
| 2018/0242172 A1* | 8/2018 | Kim | H04B 7/024 | |
| 2018/0279149 A1* | 9/2018 | Li | H04L 5/0092 | |
| 2018/0376359 A9* | 12/2018 | Kim | H04L 5/0053 | |
| 2019/0011852 A1* | 1/2019 | Frenne | H04W 16/14 | |
| 2019/0044685 A1* | 2/2019 | Nimbalker | H04W 72/042 | |
| 2019/0074932 A1* | 3/2019 | Kim | H04L 5/0023 | |
| 2019/0109607 A1* | 4/2019 | Guan | H04W 16/10 | |
| 2020/0092744 A1* | 3/2020 | Li | H04L 1/0027 | |
| 2020/0233334 A1* | 7/2020 | Frenne | G03G 15/0865 | |
| 2021/0067996 A1* | 3/2021 | Bhorkar | H04B 7/063 | |

FOREIGN PATENT DOCUMENTS

| | | |
|---|---|---|
| CN | 104604283 A | 5/2015 |
| JP | 2015008526 A | 1/2015 |
| WO | WO-2012155511 A1 | 11/2012 |
| WO | WO-2014109561 A1 | 7/2014 |
| WO | WO-2015005609 A1 | 1/2015 |

OTHER PUBLICATIONS

Motorola Mobility, "EPDCCH Design Aspects", 3GPP TSG RAN WG1 Meeting #68bis, R1-121583, Jeju, Korea, Mar. 26-30, 2012, 3 pgs., XP050599847, 3rd Generation Partnership Project.

NEC Group, "Requirements and Necessary Enhancements for Phase 1 NCT in Release 12", 3GPP TSG RAN WG1 Meeting #72, R1-130361, St. Julian's, Malta, Jan. 28-Feb. 1, 2013, 5 pgs., XP050663442, 3rd Generation Partnership Project.

Samsung, "Further Discussion and Simulation Results for Timing Offset on Non-Collocated Antennas", 3GPP TSG-RAN WG4 RAN4 Meeting #66, R4-130309, Malta, Malta, Jan. 28-Feb. 1, 2013, 13 pgs., XP050674794, 3rd Generation Partnership Project.

ISA/EP, Partial International Search Report of the International Searching Authority, Int'l Appl. No. PCT/US2016/033953, dated Aug. 17, 2016, European Patent Office, Rijswijk, NL, 7 pgs.

Motorola Mobility: "Further Discussions on Physical Layer enhancement options for LAA-LTE", 3GPP TSG RAN WG1 #80bis, 3GPP Draft, 3GPP TSG RAN WG1 #80bis, R1-151987 Phylayeroptions V2, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015, Apr. 19, 2015, XP050934838, 20200617, Retrieved from the Internet: URL: http://www.3gpp.org/ftp/tsg_ran/WG1_RL1/TSGR1_80b/Docs/R1-151987.zip.

NEC:"Requirements and Necessary Enhancements for Phase 1 NCT inRelease 12", 3GPP TSG RAN WG1 Meeting #72, 3GPP Draft; R1-130361, St Julian's, Malta, Jan. 28-Feb. 1, 2013, pp. 1-7.

(56) References Cited

OTHER PUBLICATIONS

Qualcomm Incorporated: "Further Details on PHY Layer Options for LAA", 3GPP Draft, 3GPP TSG RAN WG1 #81 ,R1-152791—Further Details on PHY Layer Options for LAA, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015 May 24, 2015 (May 24, 2015), pp. 1-7, XP050973354, Retrieved from the Internet: URL: http://www.3gpp.org/ftp/Meetings_3GPP_SYNC/RAN1/Docs/ [retrieved on May 24, 2015].

Samsung: "Discussion on CSI measurement and reporting for LAA", 3GPP Draft, 3GPP TSG RAN WG1 Meeting #81, R1-152868 CSI for LAA, 3rd Generation Partnership Project (3GPP), Mobile Competence Centre, 650, Route Des Lucioles,F-06921 Sophiaantipolis Cedex, France, vol. RAN WG1, No. Fukuoka, Japan, May 25, 2015-May 29, 2015 May 24, 2015 (May 24, 2015), XP050972362, pp. 1-3, Retrieved from the Internet: URL:http://www.3gpp.org/ftp/Meetings_3GPP_SYNC/RAN1/Docs/ [retrieved on May 24, 2015].

\* cited by examiner

CHANNEL STATE INFORMATION REFERENCE SIGNALS IN CONTENTION-BASED SPECTRUM

CROSS REFERENCES

The present application for patent claims priority to U.S. Provisional Patent Application No. 62/169,418 by Sun et al., entitled "Channel State Information Reference Signals in Contention-Based Spectrum," filed Jun. 1, 2015, assigned to the assignee hereof.

BACKGROUND

The following relates generally to wireless communication and more specifically to channel state information (CSI) reference signals (RS) in contention-based spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple access communications system may include a number of base stations, each simultaneously supporting communication for multiple communication devices, which may be otherwise known as user equipment (UE).

In some cases, a wireless device may operate in unlicensed, shared, or other contention-based spectrum. Such a wireless device may also operate (e.g., receive) transmissions using multiple layers based on multiple antenna ports. If the number of layers exceeds a threshold, common or cell-specific reference signals (CRS) may be insufficient to provide suitable CSI. This may result in lost packets or other communications disruptions. Employing a CSI RS for use in computing CSI may help alleviate such issues; but systems utilizing CSI RS may need to account for specific issues that arise in the context of contention-based spectrum.

SUMMARY

A user equipment (UE), which may be operating in a contention-based spectrum, may receive signaling to indicate the presence of channel state information (CSI) reference signals (RS) (e.g., aperiodic CSI RS), and may receive the CSI RS according to the signaling. The UE may then compute a channel quality indicator (CQI) based on CSI RS in addition to common or cell-specific reference signals (CRS), and transmit the CQI report to a base station. In some cases, the CSI RS may be received following the physical downlink control channel (PDCCH). In some cases, a quasi-periodic CSI RS may be employed. For example, the UE may identify a periodic anchor subframe, and locate the CSI RS based on constant offset from the anchor subframe.

A method of wireless communication is described. The method may include receiving signaling indicative of a CSI RS presence, receiving the CSI RS according to the received signaling, and computing a CQI based at least in part on CSI RS.

An apparatus for wireless communication is described. The apparatus may include means for receiving signaling indicative of a CSI RS presence, means for receiving the CSI RS according to the received signaling, and means for computing a CQI based at least in part on CSI RS.

A further apparatus for wireless communication is described. The apparatus may include a processor, memory in electronic communication with the processor, and instructions stored in the memory and operable, when executed by the processor, to cause the apparatus to receive signaling indicative of a CSI RS presence, receive the CSI RS according to the received signaling, and compute a CQI based at least in part on CSI RS.

A non-transitory computer-readable medium storing code for wireless communication is described. The code may include instructions executable to receive signaling indicative of a CSI RS presence, receive the CSI RS according to the received signaling, and compute a CQI based at least in part on CSI RS.

Some examples of the method, apparatuses, or non-transitory computer-readable medium described herein may further include processes, features, means, or instructions for receiving a CRS, wherein the CQI is based at least in part on the CRS. Additionally or alternatively, in some examples receiving the CRS comprises receiving a preamble comprising the CRS.

Some examples of the method, apparatuses, or non-transitory computer-readable medium described herein may further include processes, features, means, or instructions for receiving a PDCCH, wherein the CSI RS is received following the PDCCH. Additionally or alternatively, in some examples the signaling indicative of the CSI RS presence comprises a physical channel.

In some examples of the method, apparatuses, or non-transitory computer-readable medium described herein, the signaling indicative of the CSI RS presence comprises a portion of a physical control format indicator channel (PCFICH). Additionally or alternatively, in some examples the signaling indicative of the CSI RS presence comprises a portion of a physical frame format indicator channel (PFFICH).

In some examples of the method, apparatuses, or non-transitory computer-readable medium described herein, the CSI RS comprises a plurality of symbol periods. Additionally or alternatively, in some examples a density of the CSI RS is based at least in part on an interference measurement gap.

In some examples of the method, apparatuses, or non-transitory computer-readable medium described herein, receiving the CSI RS comprises receiving the CSI RS in a final transmission time interval (TTI) of downlink (DL) burst. Additionally or alternatively, in some examples receiving the CSI RS comprises receiving a DL TTI burst comprising a first CSI RS and a second CSI RS according to the signaling, wherein the CQI comprises a first CQI computed based at least in part on the first CSI RS and a second CQI computed based at least in part on the second CSI RS.

Some examples of the method, apparatuses, or non-transitory computer-readable medium described herein may further include processes, features, means, or instructions for transmitting a report comprising the CQI, wherein the report comprises an indication that the CQI is based at least in part on the CSI RS.

A method of wireless communication is described. The method may include identifying a first subframe indicative of a CSI RS presence, determining that a second subframe comprises the CSI RS based at least in part on the identified first subframe and an offset, and receiving the CSI RS during the second subframe.

An apparatus for wireless communication is described. The apparatus may include means for identifying a first subframe indicative of a CSI RS presence, means for determining that a second subframe comprises the CSI RS based at least in part on the identified first subframe and an offset, and means for receiving the CSI RS during the second subframe.

A further apparatus for wireless communication is described. The apparatus may include a processor, memory in electronic communication with the processor, and instructions stored in the memory and operable, when executed by the processor, to cause the apparatus to identify a first subframe indicative of a CSI RS presence, determine that a second subframe comprises the CSI RS based at least in part on the identified first subframe and an offset, and receive the CSI RS during the second subframe.

A non-transitory computer-readable medium storing code for wireless communication is described. The code may include instructions executable to identify a first subframe indicative of a CSI RS presence, determine that a second subframe comprises the CSI RS based at least in part on the identified first subframe and an offset, and receive the CSI RS during the second subframe.

In some examples of the method, apparatuses, or non-transitory computer-readable medium described herein, determining frame information is based at least in part on a preamble or a PFFICH, or both, wherein identifying the first subframe comprises determining that a frame comprises the first subframe based at least in part on the frame information and a periodicity of the first subframe. Additionally or alternatively, some examples may include processes, features, means, or instructions for receiving signaling indicative of the offset.

In some examples of the method, apparatuses, or non-transitory computer-readable medium described herein, the offset comprises a predefined duration.

A method of wireless communication is described. The method may include transmitting signaling indicative of a CSI RS presence, transmitting the CSI RS according to the signaling, and receiving a report comprising CQI computed based at least in part on the CSI RS.

An apparatus for wireless communication is described. The apparatus may include means for transmitting signaling indicative of a CSI RS presence, means for transmitting the CSI RS according to the signaling, and means for receiving a report comprising CQI computed based at least in part on the CSI RS.

A further apparatus for wireless communication is described. The apparatus may include a processor, memory in electronic communication with the processor, and instructions stored in the memory and operable, when executed by the processor, to cause the apparatus to transmit signaling indicative of a CSI RS presence, transmit the CSI RS according to the signaling, and receive a report comprising CQI computed based at least in part on the CSI RS.

A non-transitory computer-readable medium storing code for wireless communication is described. The code may include instructions executable to transmit signaling indicative of a CSI RS presence, transmit the CSI RS according to the signaling, and receive a report comprising CQI computed based at least in part on the CSI RS.

Some examples of the method, apparatuses, or non-transitory computer-readable medium described herein may further include processes, features, means, or instructions for identifying a UE configured for CSI RS based CQI reporting, wherein the signaling is transmitted based at least in part on identifying the UE. Additionally or alternatively, some examples may include processes, features, means, or instructions for determining that the CQI was computed using the CSI RS based at least in part on transmitting the CSI RS.

Some examples of the method, apparatuses, or non-transitory computer-readable medium described herein may further include processes, features, means, or instructions for determining that the CQI was computed using the CSI RS based at least in part on an indicator received from a UE, wherein the report comprises the indicator. Additionally or alternatively, some examples may include processes, features, means, or instructions for determining a transmission pattern for serving a UE in coordinated multiple point (CoMP) scheme, and transmitting the CSI RS and the signaling based at least in part on the transmission pattern.

Some examples of the method, apparatuses, or non-transitory computer-readable medium described herein may further include processes, features, means, or instructions for transmitting a DL burst comprising both a first CSI RS directed to a first user equipment (UE) and a second CSI RS directed to a second UE according to the signaling, and receiving a first report comprising a first CQI computed by the first UE based at least in part on the first CSI RS and receiving a second report comprising a second CQI computed by the second UE based at least in part on the second CSI RS.

A method of wireless communication is described. The method may include identifying a first subframe indicative of a channel CSI RS presence, determining that a second subframe comprises the CSI RS based at least in part on the identified first subframe and an offset, and transmitting the CSI RS during the second subframe.

An apparatus for wireless communication is described. The apparatus may include means for identifying a first subframe indicative of a channel CSI RS presence, means for determining that a second subframe comprises the CSI RS based at least in part on the identified first subframe and an offset, and means for transmitting the CSI RS during the second subframe.

A further apparatus for wireless communication is described. The apparatus may include a processor, memory in electronic communication with the processor, and instructions stored in the memory and operable, when executed by the processor, to cause the apparatus to identify a first subframe indicative of a channel CSI RS presence, determine that a second subframe comprises the CSI RS based at least in part on the identified first subframe and an offset, and transmit the CSI RS during the second subframe.

A non-transitory computer-readable medium storing code for wireless communication is described. The code may include instructions executable to identify a first subframe indicative of a channel CSI RS presence, determine that a second subframe comprises the CSI RS based at least in part on the identified first subframe and an offset, and transmit the CSI RS during the second subframe.

Some examples of the method, apparatuses, or non-transitory computer-readable medium described herein may further include processes, features, means, or instructions for transmitting signaling indicative of the offset. Additionally or alternatively, in some examples the offset comprises a predefined duration.

BRIEF DESCRIPTION OF THE DRAWINGS

Aspects of the disclosure are described in reference to the following figures.

DETAILED DESCRIPTION

Wireless systems may use signals such as common or cell-specific reference signals (CRS) or channel state information (CSI) reference signals (RS), or both, to determine channel conditions. For example, in some systems up to four antenna ports may be supported with CRS-based measurements, while CSI RS-based measurements may be used if more antenna ports are employed. CSI RS may be transmitted on a periodic, aperiodic, or quasi-periodic basis.

Aperiodic CSI RS may utilize signaling to indicate when CSI RS are present for use. A user equipment's (UE) use of the CSI RS may, as mentioned, depend on the number of antenna ports being used, as well as whether CSI RS is present. Chanel quality reports may be based on the aperiodic CSI RS when CSI RS is available. Aperiodic CSI RS transmission design can, in some cases, use various physical channels, such as physical control format indicator channel (PCFICH) or physical frame format indicator channel (PFFICH), to indicate the presence of CSI RS in a particular transmission time interval (TTI).

In some cases, periodic CSI RS may be employed for contention-based spectrum. For instance, a fixed CSI RS location defined by a period and an offset within subframes may be used. The location and period of the CSI RS may be indicated to a UE; but unlike aperiodic CSI RS, the presence or absence of the CSI RS may not be dynamically indicated.

Quasi-periodic CSI RS design may also be used in some examples. For instance, the CSI RS transmission may be transmitted according to some period, which may be associated with an anchor subframe; however, the anchor subframe may or may not be included in each radio frame. For those frames that include an anchor subframe, CSI RS transmissions may occur in another subframe of the frame. Thus, the actual CSI RS subframe can be at a fixed relative location in the frame, where the fixed relative location may be known to the UE.

In other examples, a CSI RS based on a downlink clear channel assessment exempt transmission (D-CET) may be used. The CSI RS may, for instance, be included in a periodic D-CET.

Aspects of the disclosure—including additional details of the above-introduced periodic, aperiodic, and quasi-periodic CSI RS schemes—are described below in the context of a wireless communication system. Specific examples are then described for aperiodic CSI RS, periodic CSI RS, and CSI RS tone placement. These and other aspects of the disclosure are further illustrated by and described with reference to apparatus diagrams, system diagrams, and flowcharts that relate to CSI RS in contention-based (e.g., unlicensed or shared) spectrum.

Figure 1:
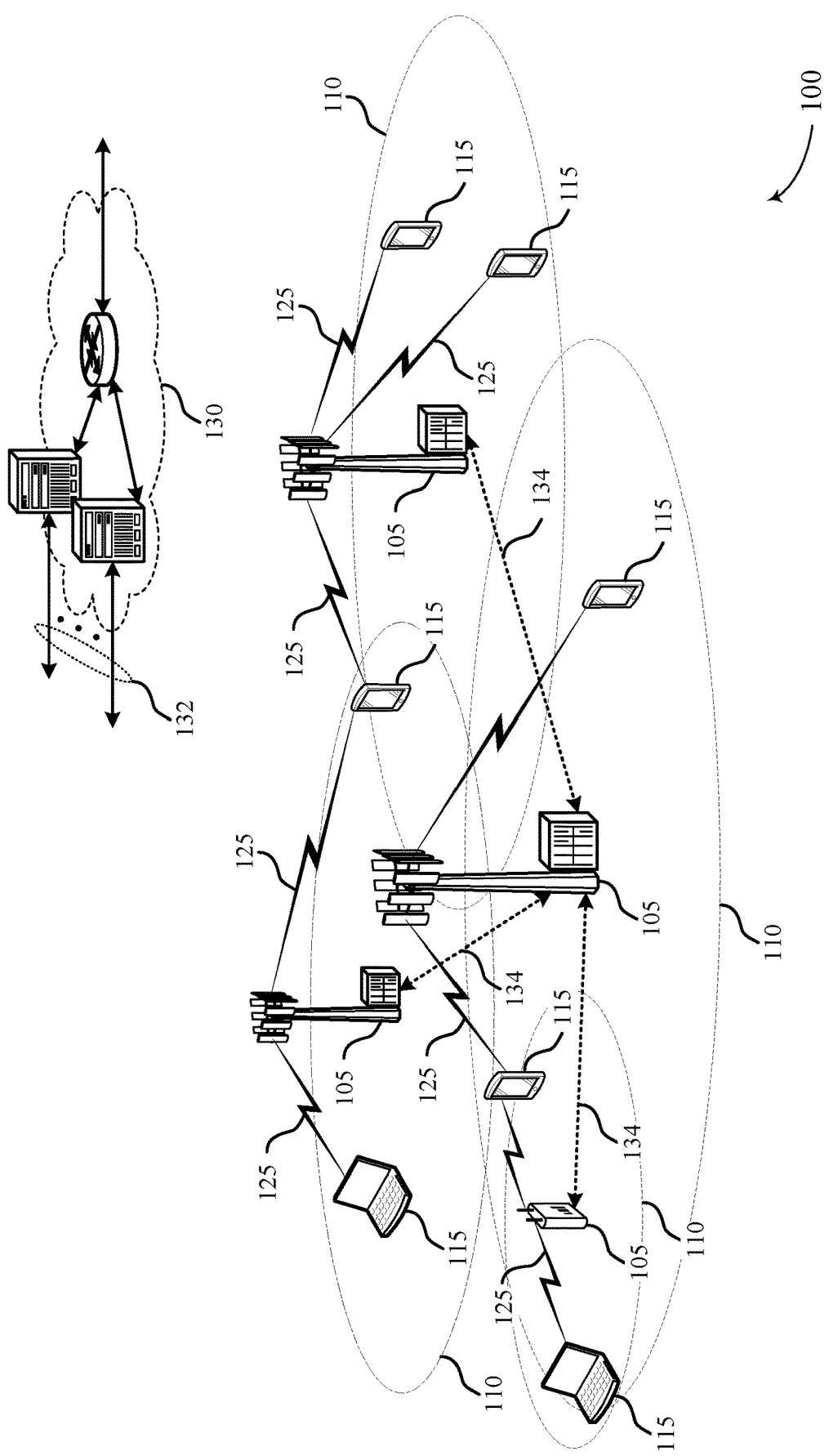
FIG. 1 illustrates an example of a wireless communications system that supports channel state information (CSI) reference signals (RS) in contention-based spectrum in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network. Wireless communications system 100 may utilize contention-based spectrum such as shared or unlicensed spectrum. Furthermore, UEs 115 and base stations 105 may operate (e.g., receive and transmit) using multiple layers based on multiple antenna ports. If the number of layers exceeds a threshold, channel state information CSI RS may be used instead of or in addition to CRS in order to determine channel state information.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations or multiple antennas on the UE to take advantage of multipath environments to transmit multiple data streams. CoMP includes techniques for dynamic coordination of transmission and reception by a number of base stations 105 to improve overall transmission quality for UEs as well as increasing network and spectrum utilization.

A base station 105 may insert periodic pilot symbols, such as CRS, in downlink transmissions to aid UEs 115 in channel estimation and coherent demodulation. CRS may include one of multiple (e.g., 504) different cell identities. They may be modulated using quadrature phase shift keying (QPSK) and may be power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signals (DMRS), also referred to as UE-specific reference signals or UE RS, may be directed toward specific UEs 115 and may be transmitted on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as CSI RS may be included to aid in generating CSI, for example, in cases involving more than a threshold number of information layers in a signal. On the UL, a UE 115 may transmit a combination of periodic sounding reference signal (SRS) and UL DMRS for link adaptation and demodulation, respectively.

A base station 105 may gather channel condition information from a UE 115 in order to efficiently configure and schedule the channel (e.g., communication link 125). This information may be sent from the UE 115 in the form of a channel state report or CSI. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indication (CQI) representing the highest modulation and coding scheme (MCS) that may be used. CQI may be calculated by a UE 115 after receiving predetermined pilot symbols described above, such as CRS or CSI RS. RI and PMI may be excluded if the UE 115 does not support spatial multiplexing (or is not in support spatial mode). The types of information included in the report may determine a reporting type. Channel state reports may be periodic or aperiodic. That is, a base station 105 may configure a UE 115 to send periodic reports at regular intervals, and may also request additional reports to be utilized. Aperiodic reports may include wideband reports indicating the channel quality across an entire cell bandwidth, UE selected reports indicating a subset of the preferred subbands, or configured reports in which the subbands reported are selected by the base station 105. According to the present disclosure, wireless communications system 100 may utilize aperiodic CSI RS in contention-based spectrum.

A UE 115 or base station 105 may operate (e.g., communicate) in a shared or unlicensed frequency spectrum, which is referred to herein as contention-based spectrum because various devices may be contending for access to the spectrum resources. These devices may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. In some cases, transmissions may be exempt from performing a CCA. Such a transmission may be known as a CCA exempt transmission (CET), and may be more specifically referred to as a D-CET or uplink CET (U-CET).

In some cases, wireless communications system 100 may utilize one or more enhanced component carriers (eCCs). An eCC may be characterized by one or more features including: flexible bandwidth, different transmission time interval (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in contention-based spectrum, including unlicensed or shared spectrum (e.g., where more than one operator is licensed to use the spectrum). An eCC characterized by flexible bandwidth may include one or more segments that may be utilized by certain UEs 115 (e.g., MTCs) that may not be capable of monitoring the whole bandwidth or prefer to use a limited bandwidth (e.g., to conserve power).

A frame structure may be used to organize physical resources for communication via communication links 125. A frame may be a 10 ms interval that may be further divided into 10 equally sized subframes. Each subframe may include two consecutive time slots. Each slot may include 6 or 7 orthogonal frequency division multiple access (OFDMA) symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some REs may include DL reference signals (DL-RS). The DL-RS may include a CRS, UE-RS, or CSI RS, or a combination of the three. The number of bits carried by each resource element may depend on the modulation scheme (the configuration of symbols that may be selected during each symbol period). Thus, the more resource blocks that a UE 115 receives and the higher the modulation scheme, the higher the data rate may be.

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information.

As described below, UE 115 may, in some cases, receive signaling to indicate the presence of CSI RS (e.g., an aperiodic CSI RS), and may receive the CSI RS according to the signaling. The UE 115 may then compute a CQI based on CSI RS or CRS, or both, and may transmit the CQI in a report to a base station 105. In some cases, the CSI RS may be received following the PDCCH (e.g., in a symbol period immediately following PDCCH). In other cases, a quasi-periodic CSI RS scheme may be employed, and the UE 115 may identify a periodic anchor subframe, and may locate a subframe with CSI RS based on an offset from the anchor subframe. Signaling indicating the presence of CSI RS may be broadcast (e.g., via a common physical downlink control channel (C-PDCCH), PCFICH, PFFICH, or the like) or unicast (e.g., via a PDCCH) to UEs 115. In some cases, the signaling may include an indication of both the subframe type and the subframe length.

Figure 2:
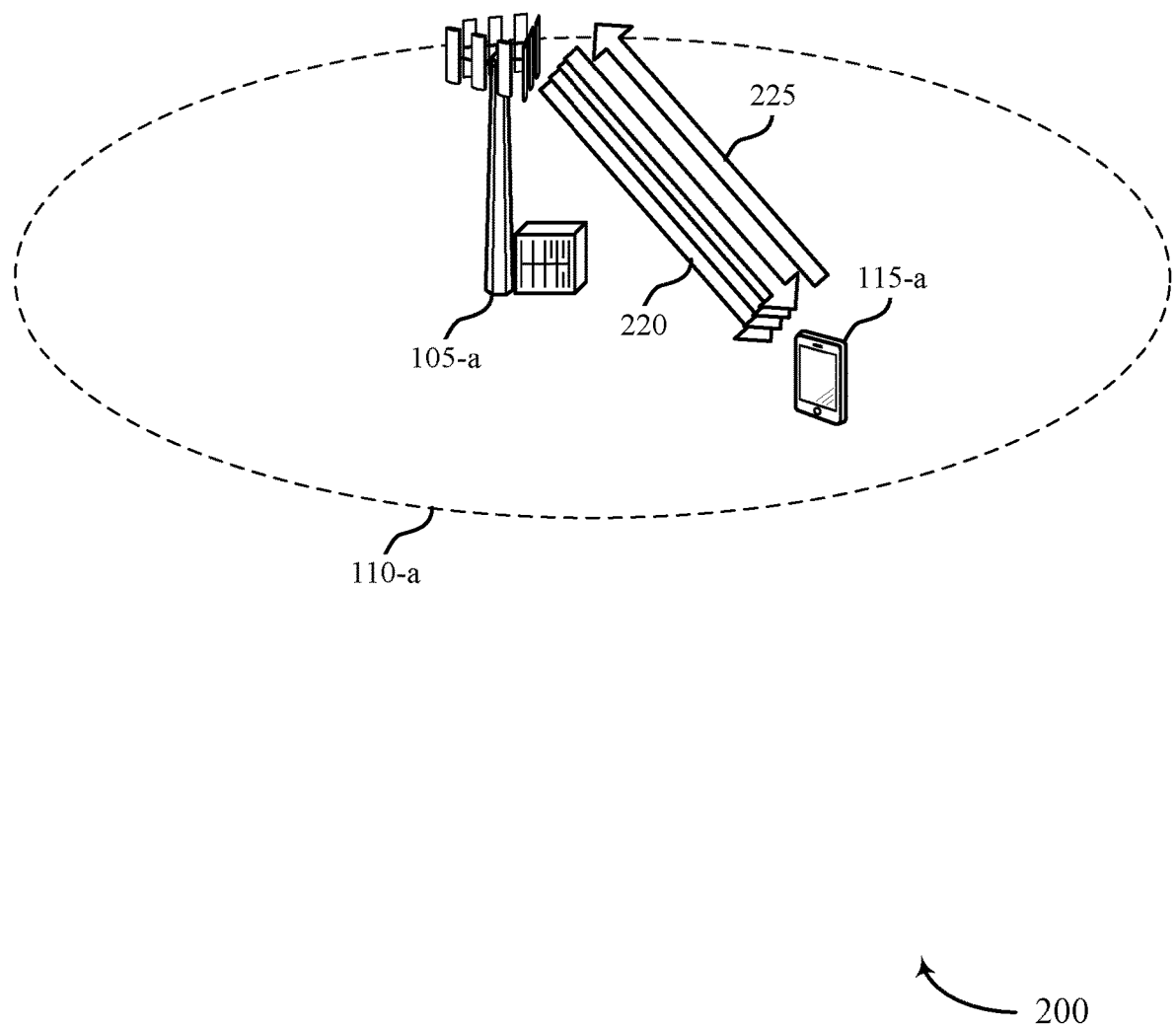
FIG. 2 illustrates an example of a wireless communications system that supports CSI RS in contention-based spectrum in accordance with various aspects of the present disclosure.

FIG. 2 illustrates an example of a wireless communications system 200 for CSI RS in contention-based spectrum in accordance with various aspects of the present disclosure. Wireless communications system 200 may include a UE 115-a and base station 105-a, which may be examples of a UE 115 and base station 105 described with reference to FIG. 1. Wireless communications system 200 may utilize periodic, aperiodic, quasi-periodic, or D-CET based CSI RS to support CQI reporting.

Downlink channel 220 and uplink channel 225 may be used to communicate data and control information between base station 105-a and UE 115-a. Downlink channel 220 and uplink channel 225 may represent various data or control channels. For instance, the channels may be divided into or represented as logical channels, transport channels, and physical layer channels. Downlink channel 220 may also be classified into control channels and traffic channels.

Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, dedicated traffic channel (DTCH) for dedicated UE data, and multicast traffic channel (MTCH) for multicast data.

DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data.

DL physical channels may include physical broadcast channel (PBCH) for broadcast information, PCFICH for control format information, PFFICH for frame format information (e.g., in contention-based spectrum), physical downlink control channel (PDCCH) for control and scheduling information, physical HARQ indicator channel (PHICH) for HARQ status messages, physical downlink shared channel (PDSCH) for user data and physical multicast channel (PMCH) for multicast data, C-PDCCH for frame format or timing information, including information related to various transmission opportunities (TxOP). UL physical channels may include physical random access channel (PRACH) for access messages, physical uplink control channel (PUCCH) for control data, and physical uplink shared channel (PUSCH) for user data.

A downlink channel 220 from the base station 105-a to the UE 115-a may utilize multiple transmission layers, for example, and may include downlink physical channels (e.g., PDCCH, C-PDCCH, PFFICH, PCFICH), which may indicate the existence of symbols that include CSI RS symbols or CRS symbols. Uplink channel 225 may also be used to transmit data and control using the various uplink channels described above. For example, UE 115-a may calculate and transmit a CQI (e.g., based on the CRS, CSI RS, or both). The reference signal configuration may include aperiodic CSI RS, periodic CSI RS, quasi-periodic CSI RS, or D-CET based CSI RS.

In eCC operation (e.g., for examples in which UE 115-a is configured with an eCC or other carrier utilizing contention-based spectrum) certain preambles may be transmitted, which may include or serve as a CRS for a certain number of antenna ports (e.g., up to four of which CRS ports). In some cases, however, and as discussed above, a greater number of antenna ports may be used (e.g., eight antenna port operations). Such operation may, for instance, be employed to target low-Doppler, flat-fading-channel UEs 115 (e.g., UE 115-a). This higher rank (e.g., increased layer) operation in a contention-based spectrum may be accomplished as described herein using CSI RS (e.g., integrated in a frame structure) for CQI measurements with reasonably low overhead, without puncturing data REs, and with support for CoMP operation.

Several different CSI RS transmission schemes may be variously employed to support CQI for higher rank transmissions in a contention-based spectrum. For example, in an aperiodic scheme, CSI RS may be included in OFDM symbols following a PDCCH portion of a transmission. In various examples, the presence of such symbols may be indicated with a physical channel (or a portion of a physical channel), such as PCFICH or PFFICH. Aperiodic CSI RS may be employed with CRS, which may allow UE 115-a to use both CSI RS and CRS to compute CQI. When CSI RS is not present, UE 115-a may use CRS to compute CQI. In some cases, aperiodic CSI RS may be employed for dedicated, on-demand CSI RS. For instance, UE 115-a may be triggered to report CQI after a DL burst with CSI RS, while other UEs may rely on CRS.

In some examples, base station 105-a may transmit more than one CSI RS in a DL burst. That is, base station 105-a may transmit a DL burst that includes different CSI RS directed to one or more UEs 115. For example, base station 105-a may transmit a DL burst including a first CSI RS directed to a UE 115 and a second CSI RS directed to a different UE 115. The UEs 115 may thus compute distinct CQI according to their respective CSI RS contained in the DL burst.

As mentioned, the presence of CSI RS may be indicated using PCFICH. In some cases, PCFICH is configured with (e.g., conveyed) using two bits, which may be used to indicate one, two, or three OFDM symbols for PDCCH. In some examples, The aperiodic CSI RS scheme may make use of the typically reserved field of '11' of PCFICH to indicate CSI RS presence in a TTI, for instance. For example, PCFICH having a value '11' can mean two PDCCH symbols followed by two CSI RS symbols. In some cases, this interpretation may apply to the last TTI rather than to each TTI. Such an aperiodic CSI RS may allow flexibility for resource allocation; for instance, if there are no UEs 115 within geographic coverage area 110-a configured to use CSI RS, base station 105-a (or the network operator) may simply opt not to include CSI RS in downlink transmissions.

Additionally or alternatively, the presence of CSI RS may be indicated using PFFICH. In some cases, the reserved fields of PCFICH may be unavailable, and using PFFICH may provide another readily available option. For example, PFFICH may be configured with one or more entries (e.g., fields) to indicate multiple special frame formats with known CSI RS locations. PFFICH may, in some examples, be configured with additional bits that may be used to indicate CSI RS presence in each frame format.

An aperiodic CSI RS scheme may be configured for CoMP operation (e.g., simultaneous transmission from multiple base stations 105). For example, some systems, including certain LTE/LTE-A systems (e.g., those employ release 10 of the LTE standard) may configure UEs 115 with multiple CSI RS processes to support CoMP operation. In such cases, UEs 115 may be configured to monitor one or more CSI RS/CSI interference measurement (IMR) pair, where each pair may represent a serving/interfering assumption, and the UE may compute one CQI for each pair. An aperiodic CSI RS scheme may, however, allow for coordinated transmission of CSI RS across base station 105 using CoMP. The base station 105 (including base station 105-a) using CoMP may thus select an ON/OFF pattern to transmit CSI RS in a process transparent to UEs 115; and the need to configure UE 115-a with multiple CSI RS processes may be avoided. By way of example, base station 105-a, in combination with other base stations 105 (not shown in FIG. 2; may include one or more base station 105 of FIG. 1) may identify UE 115-a as a UE to serve, and base station 105 may design a CoMP CSI RS pattern, and may collect UE 115-a CQI under that CSI RS pattern to make the scheduling decision. Potential losses in scheduling ability experienced by the base station 105-a that stem from choosing between multiple CoMP scenarios from multiple CQI feedbacks to make a scheduling decision may be mitigated by sending multiple CSI RS, collecting all CQIs, and then making a scheduling decision.

In other examples, and as mentioned above, a periodic CSI RS scheme may be employed. In such cases, a fixed CSI RS location may be defined by a period and an offset within certain subframes. The location of the CSI RS may be signaled to UE 115-a by base station 105-a; but a periodic CSI RS scheme does not typically require instantaneous signaling to indicate CSI RS presence, like an aperiodic scheme, and thus may offer some reduction in system overhead in some cases. A period CSI RS scheme may also support multiple CSI RS process configurations within wireless communications system 200.

In some cases, however, due to the contention-based nature of the downlink channel 220, the downlink channel 220 may be utilized by other devices or transmissions from other devices at time when base station 105-a intends to transmit CSI RS. That is, due to other uses of the downlink channel 220, base station 105-a may be unable to transmit CSI RS subframes according to the period. In such cases, UE 115-a may recognize that downlink channel 220 is not clear, and thus that a CSI RS subframe may not be present if, for example, UE 115-a does not detect a preamble from base station 105-a. Alternatively, in some cases, base station 105-a may transmit a CSI RS subframe according to the predefined period irrespective of contending channel uses, despite potential scheduling restrictions. In such cases, UE 115-a may thus monitor for CSI RS according to the period even if the UE 115-a is otherwise not monitoring the downlink channel 220; and UE 115-a may employ certain rate-matching techniques to properly receive CSI RS in such cases. Under a periodic CSI RS scheme, CSI RS transmission time (e.g., CSI RS period) may be defined according to a system time, rather than a frame time. That is, CSI RS may be transmitted in different subframe numbers of subsequent frames. Accordingly, a subframe with CSI RS may occur at various times within a frame, which may have implications on the processing timeline of UE 115-a. For instance, if a CSI RS subframe occurs at or near the end of a frame, UE 115-a may adjust its CQI computation accordingly.

As mentioned above, a quasi-periodic CSI RS design may alleviate some issues associated with periodic CSI RS. In such schemes, and as with periodic CSI RS, a CSI RS transmission may be associated with a particular subframe, which may be referred to as an anchor subframe. However, CSI RS transmissions may occur in a different subframe than the anchor subframe; for example, the subframe with CSI RS may be at a fixed relative location in the frame, where the fixed relative location can be known to UE 115-a. This scheme may avoid scenarios in which a CSI RS subframe is transmitted at or near the end of a frame and may thus allow, in some cases, additional processing time for UE 115-a to compute CSI RS based CQI. Further details of the quasi-periodic scheme are described below with reference to FIG. 5.

In other cases, CSI RS may be D-CET based. As mentioned, D-CET may be a periodic DL transmission, to which CSI RS can be added. Such CSI RS schemes offer a degree of certainty of CSI RS transmission, and may require lower system overhead; but in some cases the frequency of CSI RS transmission may be relatively low because D-CET transmissions may be infrequent.

Figure 3:
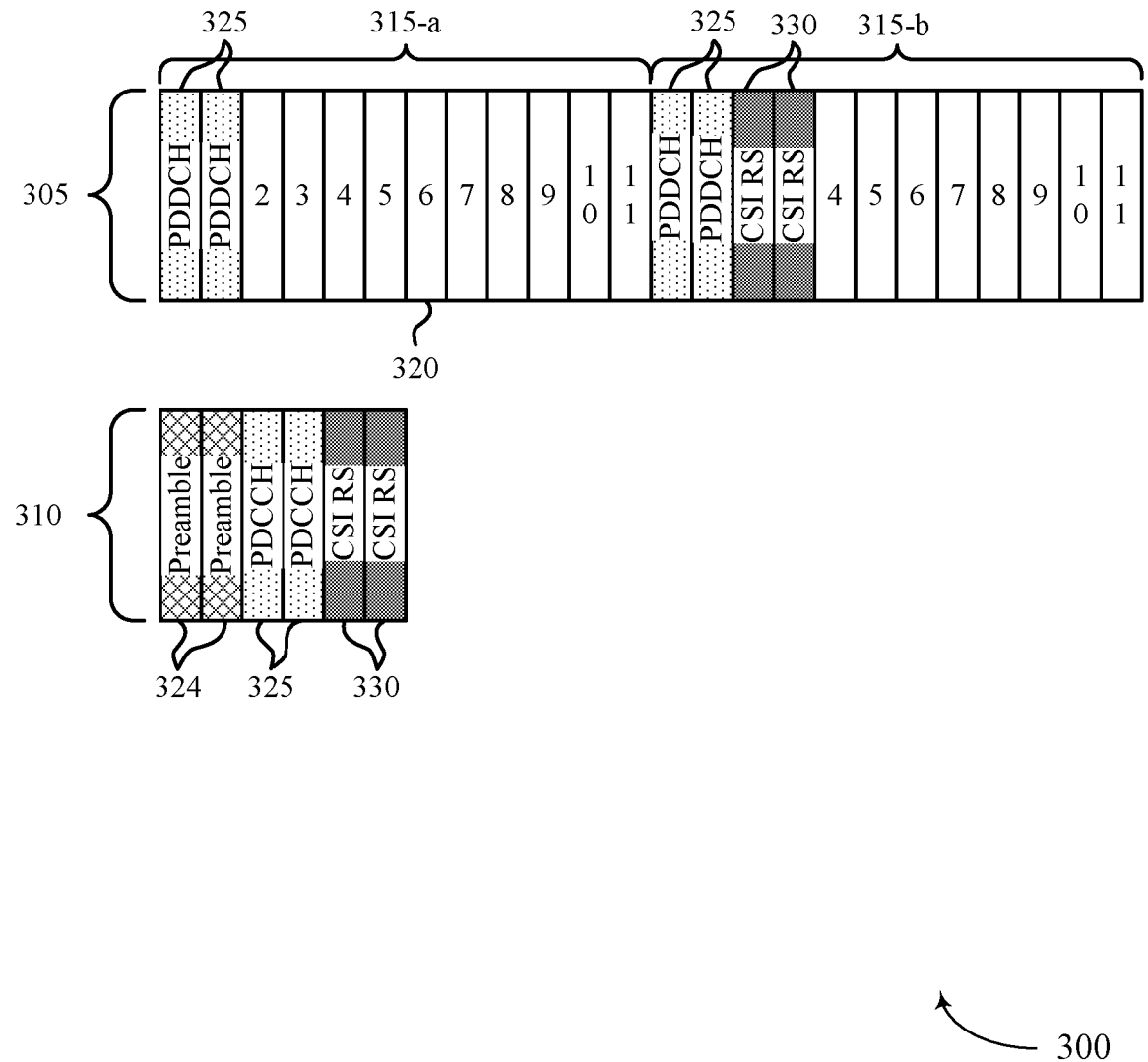
FIG. 3 illustrates examples of a transmission time interval (TTI) set that supports CSI RS in contention-based spectrum in accordance with various aspects of the present disclosure.

FIG. 3 illustrates an example of a TTI set 300 for CSI RS in contention-based spectrum in accordance with various aspects of the present disclosure. TTI set 300 may include various frame or TTI configurations utilized by a UE 115 and base station 105, which may be examples of a UE 115 and base station 105 described with reference to FIGS. 1 and 2. TTI set 300 includes example TTI structures 305 and 310. Both TTI structure 305 and 310 may be examples of transmissions on contention-based (e.g., unlicensed) spectrum. TTI structures 305 or 310, or both, may illustrate eCC transmissions.

TTI structure 305 may illustrate a portion of a radio frame that includes subframes composed of LTE OFDM symbols. TTI structure 305 may, for instance, include a number of TTIs 315, which may be subframes composed of OFDM symbols 320 (e.g., 12 symbols per subframe for extended CP use). TTI 315-*a* may include two OFDM symbols carrying PDCCH 325 and ten additional OFDM symbols 320, which may be carry PDSCH, for instance. TTI 315-*b* may likewise include PDCCH 325 in two symbols, and may include as well as two symbols with CSI RS 330. TTI 315-*b* may be referred to, in some cases, as a CSI RS subframe. CSI RS 330 in TTI 315-*b* may represent periodic, aperiodic, quasi-periodic, or the like, transmissions, as described herein. In some cases, the presence of CSI RS 330 may be indicated by signaling (including physical channel signaling) elsewhere in TTI structure 305. For instance, certain resource elements within symbols carrying PDCCH 325 may include PCFICH or C-PDCCH, which may indicate CSI RS 330 presence within TTI 315-*b*.

TTI structure 310 may illustrate a portion of a dynamic TTI, for instance. Or, TTI structure 310 may, for example, illustrate a short TTI used to convey control information or to indicate that a base station 105 is using a contention-based channel. TTI structure 310 may include two symbols carrying preamble 324, two symbols carrying PDCCH 325, and two symbols carrying CSI RS 330. CSI RS 330 in TTI structure 310 may represent periodic, aperiodic, quasi-periodic, or the like, transmissions, as described herein. In some examples, CSI RS 330 in TTI structure 310 are indicated by PFFICH, which may be included in certain REs within symbols carrying PDCCH 325. Alternatively, TTI structure 310 may illustrate a periodic transmission, and CSI RS 330 may be included in each instance that TTI structure 310 is transmitted.

According to the examples of FIG. 3, CSI RS 330 may be transmitted during the final TTI of a DL burst (e.g., TTI 315-*b*) or during a short TTI (e.g., TTI structure 310). During a DL burst, and due to the burst, a CSI RS capable UE 115 may be triggered to report CQI, at which point the UE 115 may determine whether CSI RS 330 is present in the burst and use it accordingly. TTI structures 305 and 310 may illustrate a DL burst that includes multiple subsequent TTIs 315. A base station 105 may know a priori whether a UE 115 is reporting CQI based on CSI RS 330 by virtue of including CSI RS 330 in the DL burst. Because the last TTI of a burst may be the most recently updated, including CSI RS 330 in the last TTI may improve the accuracy of information from the CSI RS. In the case of a short TTI, the CSI RS 330 transmission may replace the PDSCH segments as a receiver processing timeline buffer. Although not shown, CSI RS 330 may be transmitted in any number of locations within a TTI (e.g., subframe) or TTI structure (e.g., frame). For instance, the CSI RS may be transmitted during the earlier TTIs of a DL burst (e.g., TTI 315-*a*). This may allow for more time for CQI computation by a UE 115.

Figure 4:
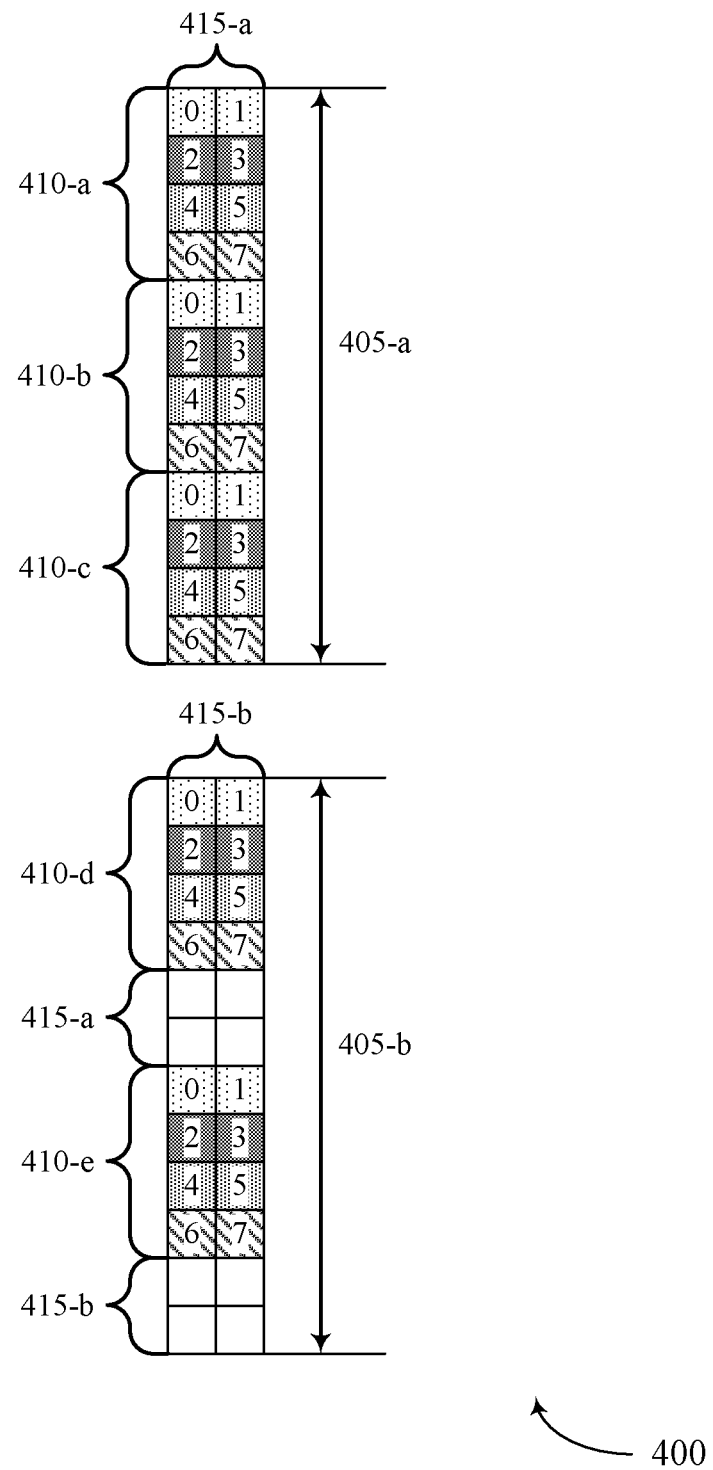
FIG. 4 illustrates examples of CSI RS resource block (RB) formats that support CSI RS in contention-based spectrum in accordance with various aspects of the present disclosure.

FIG. 4 illustrates an example of CSI RS resource block (RB) formats 400 for CSI RS in contention-based spectrum in accordance with various aspects of the present disclosure. CSI RS RB formats 400 may utilized by a UE 115 and base station 105 for CSI RS based measurements, as described with reference to FIGS. 1 and 2. RB 405-*a* may have a 900 KHz bandwidth and may represent two symbols, which may be examples of CSI RS 330 of FIG. 3, containing 12 tone pairs 415-*a*. RB 405-*b* may likewise have a 900 KHz bandwidth and may represent two symbols, which may be examples of symbols with CSI RS 330 of FIG. 3, containing 12 tone pairs 415-*b*. RB 405-*a* may include three samples of CSI RS 410-*a*, 410-*b*, and 410-*c* for eight antenna ports, or one sample per 300 KHz. RB 405-*b* may be configured with two samples of CSI RS 410-*d* and 410-*e*, or one sample per 450 KHz, which may provide additional REs available for IMR (e.g., interference measurement gaps) 415-*a* and 415-*b*. Thus, CSI RS density may be determined to accommodate IMR, and may therefore be based on interference measurement gaps.

Figure 5:
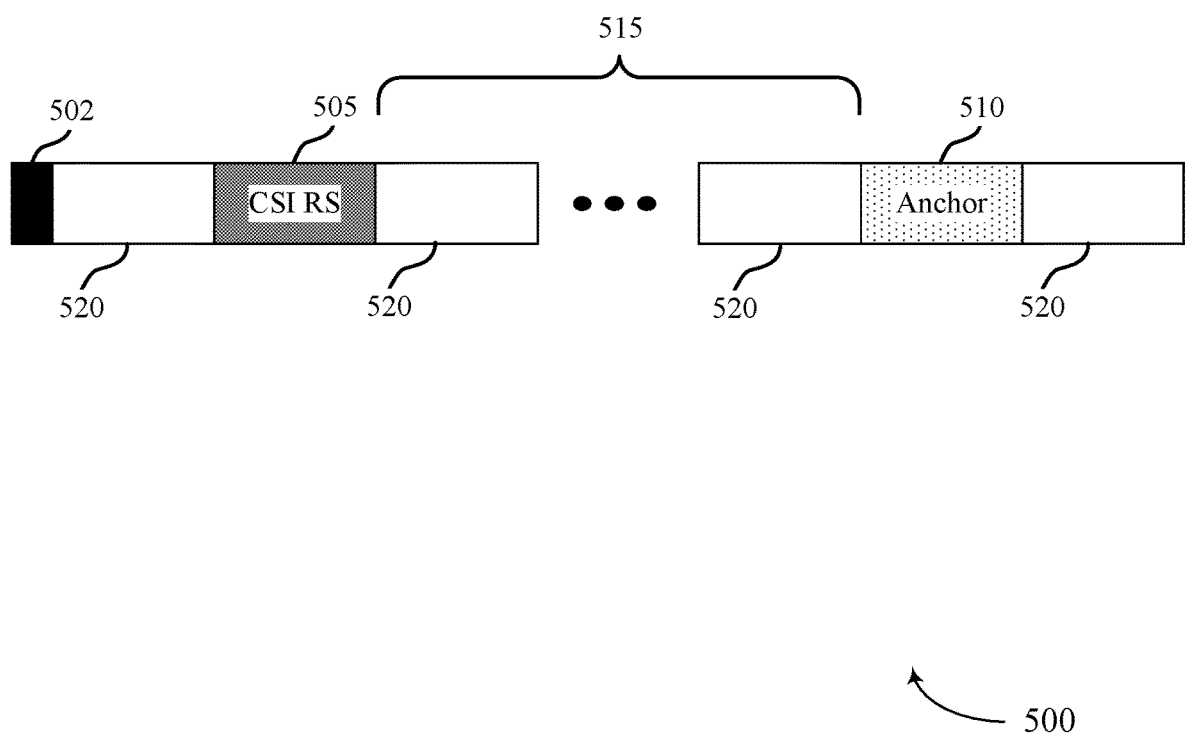
FIG. 5 illustrates an example of CSI RS frame location in contention-based spectrum in accordance with various aspects of the present disclosure.

FIG. 5 illustrates an example of a frame 500 (e.g., a radio frame) containing CSI RS in contention-based spectrum in accordance with various aspects of the present disclosure. Frame 500 may include a preamble 502, CSI RS subframe 505, and an anchor subframe 510, as well as several other subframes 520. Frame 500 may be utilized by a UE 115 and base station 105, which may be examples of a UE 115 and base station 105 described with reference to FIGS. 1 and 2. Frame 500 may also be an example of a TTI structure (e.g., TTI structure 305) of FIG. 3.

A quasi-periodic CSI RS scheme may be employed using frame 500, for instance. A system may be configured such that a base station 105 transmits CSI RS according to a period known to a UE 115. The period of CSI RS may align with an anchor subframe 510, which may or may not be present in a given frame. A UE 115 may determine whether an anchor subframe 510 is present in frame 500. UE 115 may then determine an exact location of the subframe of anchor subframe 510 (e.g., CSI RS subframe 505) based on the presence of anchor subframe 510 and an offset 515. In some cases, the offset 515 represents a relative location of CSI RS subframe 505 within frame 500. By way of example, CSI RS subframe 505 may be subframe number 2 of each frame 500 determined to include an anchor subframe 510. The location of CSI RS subframe 505 may be known or communicated to UE 115. In some cases, signaling in preamble 502 may be used to determine that frame 500 includes anchor subframe 510. CSI RS periodicity and the offset 515 may be known a priori by a UE 115 or may be communicated in radio resource control (RRC) signaling, system information broadcasts, or the like.

Figure 6:
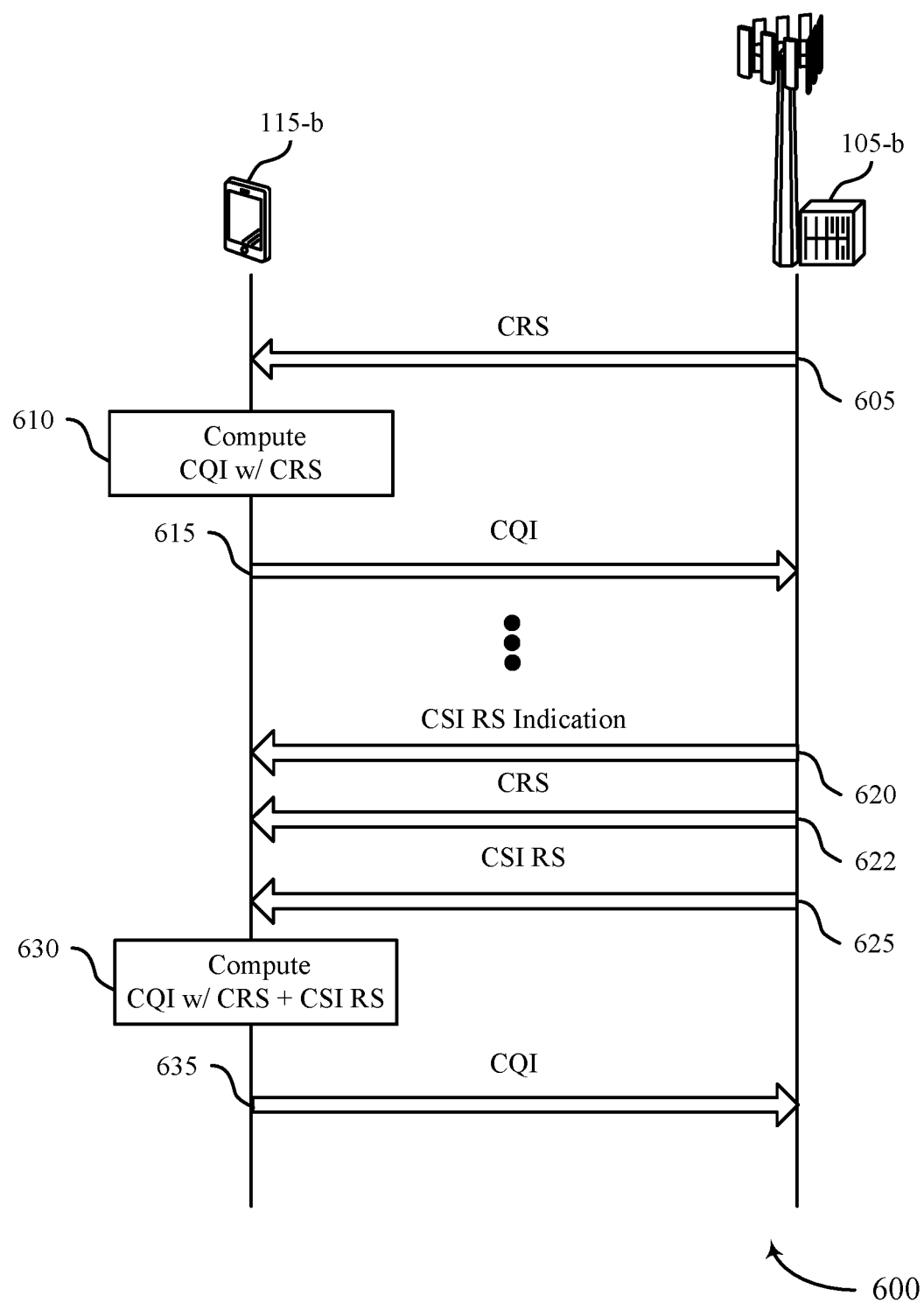
FIGS. 6-7 illustrate examples of process flows that supports CSI RS in contention-based spectrum in accordance with various aspects of the present disclosure.

FIG. 6 illustrates an example of a process flow 600 for CSI RS in contention-based spectrum in accordance with various aspects of the present disclosure. Process flow 600 may include a UE 115-*b* and base station 105-*b*, which may be examples of a UE 115 and base station 105 described with reference to FIGS. 1 and 2. For example, process flow 600 may represent a method or methods of communication using aperiodic CSI RS in contention-based spectrum.

At 605, base station 105-*b* may transmit CRS to UE 115-*b*. In some examples receiving the CRS includes receiving a preamble including the CRS. At 610, UE 115-*b* may compute CQI based on the CRS. That is, the CQI may be computed without CSI RS (e.g., if the number of communication layers is below a threshold or if CSI RS is not present). At 615, UE 115-*b* may transmit a CQI report to base station 105-*b*.

Additionally or alternatively, at 620, UE 115-*b* may transmit a CSI RS indication to UE 115-*b*. That is, prior to transmitting the CSI RS, base station 105 may transmit an indication of the presence of CSI RS to UE 115-*b*. In some examples the signaling indicative of the CSI RS presence includes a portion of a PCFICH. In some examples the signaling indicative of the CSI RS presence includes a portion of a PFFICH.

At 622, UE 115-*b* may transmit CRS to UE 115-*b*. At 625, base station 105-*b* may transmit CSI RS to UE 115-*b*. Thus, UE 115-*b* may receive the CSI RS according to the received signaling indicative of CSI RS presence. In some cases, UE 115-*b* may receive a PDCCH, such that the CSI RS may be received following the PDCCH. In some examples the signaling indicative of the CSI RS presence is a physical channel.

In some examples the CSI RS includes a plurality of symbol periods. A density of the CSI RS may, for instance, be based on an interference measurement gap, as described above. In some examples receiving the CSI RS includes receiving the CSI RS in a final TTI of a DL burst. In some examples receiving the CSI RS includes: receiving a DL TTI burst including a first CSI RS and a second CSI RS according to the signaling, such that the CQI may include a first CQI computed based on the first CSI RS and a second CQI computed based on the second CSI RS.

At 630, UE 115-*b* may compute CQI based on the CRS and CSI RS (e.g., if the number of communication layers is above a threshold). At 635, UE 115-*b* may transmit a CQI report to base station 105-*b*.

Figure 7:
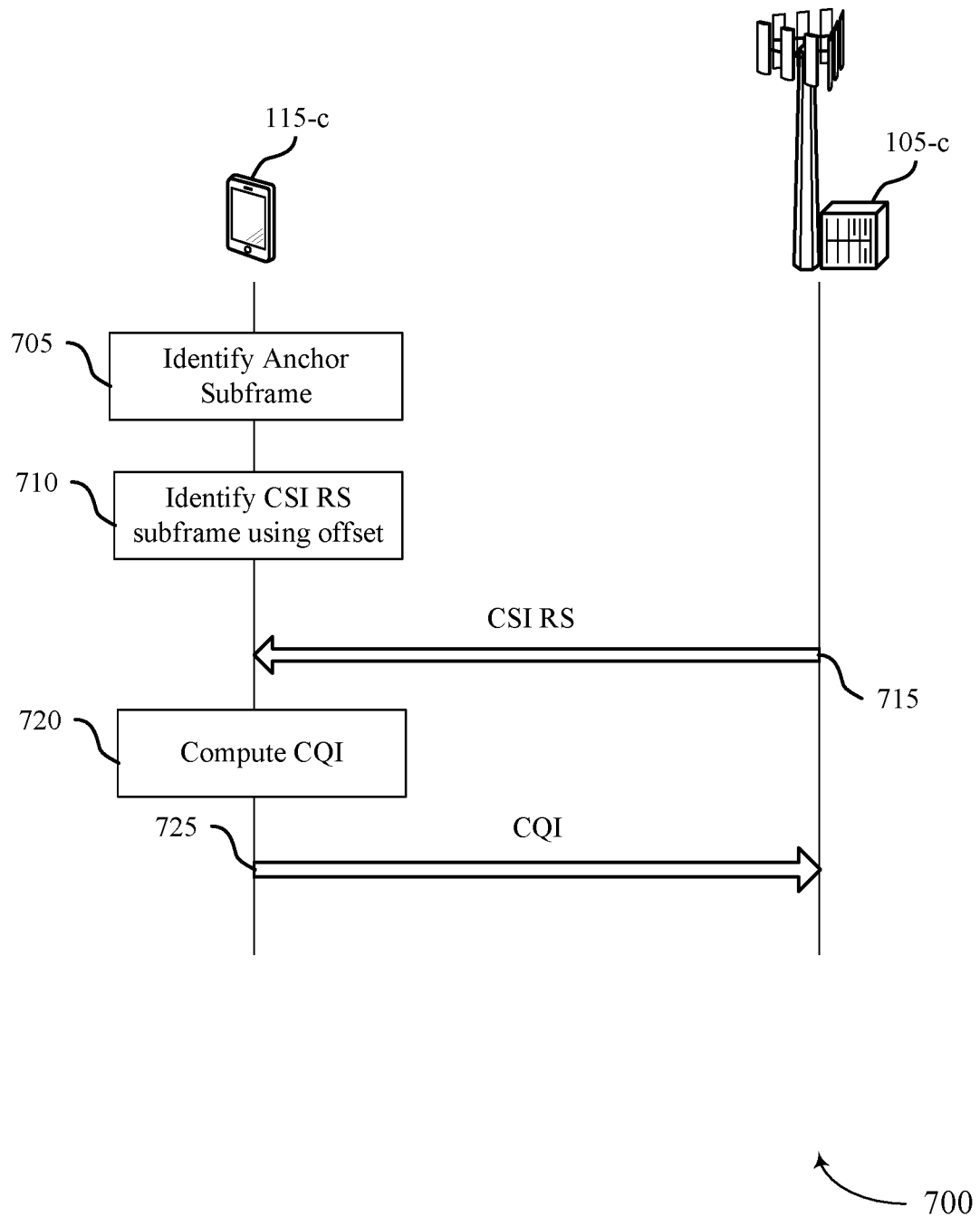

FIG. 7 illustrates an example of a process flow 700 for CSI RS in contention-based spectrum in accordance with various aspects of the present disclosure. Process flow 700 may include a UE 115-*c* and base station 105-*c*, which may be examples of a UE 115 and base station 105 described with reference to FIGS. 1-2. Process flow 700 may represent a method or methods of communication using quasi-periodic CSI RS in contention-based spectrum, for example.

At 705, UE 115-*c* may identify an anchor subframe. That is, UE 115-*c* may identify a first subframe indicative of a CSI RS presence, which may be referred to as an anchor subframe in some cases.

At 710, UE 115-*c* may identify a CSI RS subframe based on an offset from the anchor subframe. UE 115-*c* may thus determine that a second subframe includes the CSI RS based on the identified first subframe and an offset. In some examples UE 115-*c* may also determine frame information. In some examples, determining frame information is based on a preamble or a PFFICH, or both, and identifying the first subframe may include determining that a frame includes the first subframe, which may be based on the frame information and a periodicity of the first subframe. The offset between the first and second subframes (e.g., between the anchor and CSI RS subframes) may be indicated with signaling between the base station 105-*c* and the UE 115-*c* as discussed above. In some examples, the offset includes a relative location of the second subframe within a frame.

At 715, UE 115-*c* may receive a CSI RS from base station 105-*c* during the CSI RS subframe. For example, UE 115-*c* may receive the CSI RS during the second subframe. In some examples, base station 105-*c* may transmit signaling indicative of a CSI RS presence and may transmit the CSI RS according to the signaling.

At 720, UE 115-*c* may compute CQI based on the CSI RS. At 725, UE 115-*c* may report the CQI to base station 105-*c*, and base station 105-*c* may receive a report including CQI computed based on the CSI RS.

Figure 8:
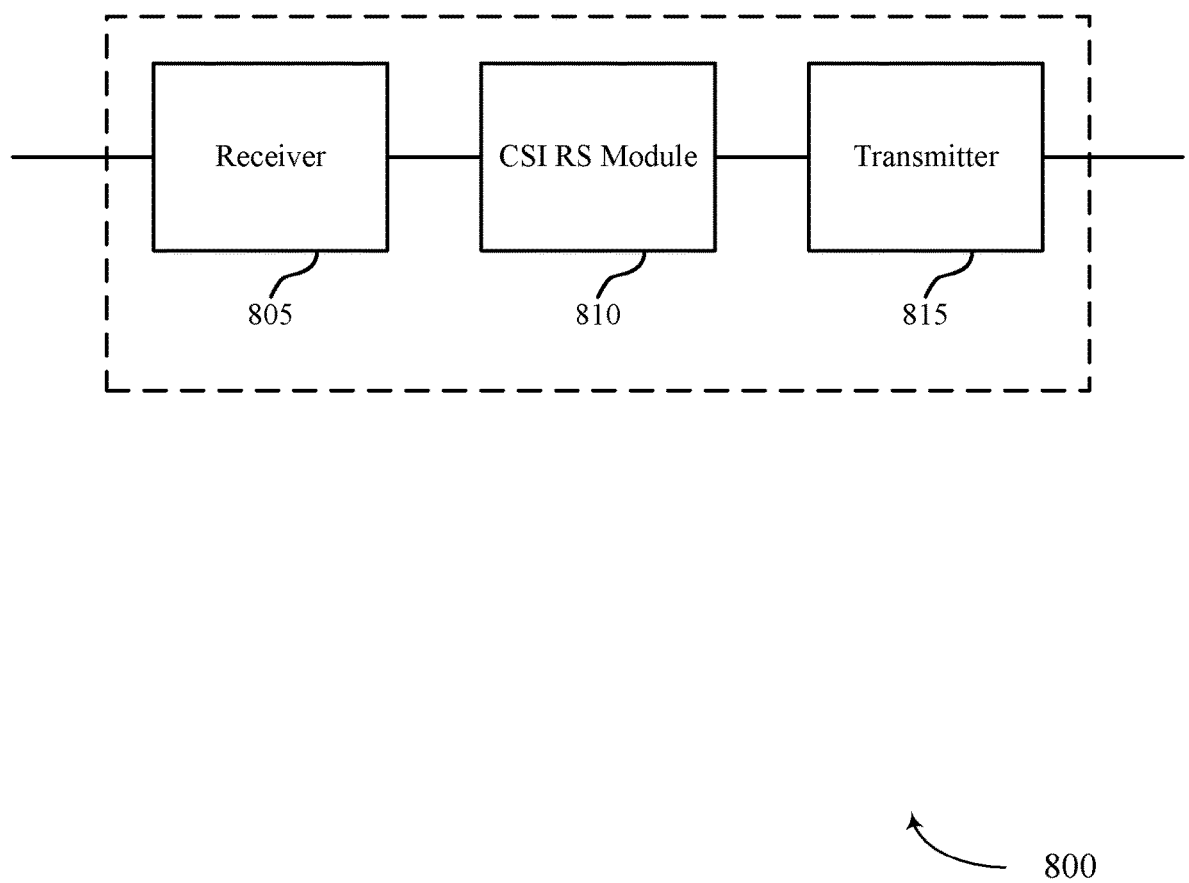
FIGS. 8-10 show diagrams of a wireless device or devices that support CSI RS in contention-based spectrum in accordance with various aspects of the present disclosure.

FIG. 8 shows a diagram of a wireless device 800 that supports CSI RS in contention-based spectrum in accordance with various aspects of the present disclosure. Wireless device 800 may be an example of aspects of a UE 115 described with reference to FIGS. 1-7. Wireless device 800 may include a receiver 805, a CSI RS module 810, or a transmitter 815. Wireless device 800 may also include a processor. Each of these components may be in communication with one another.

The receiver 805 may receive information such as packets, user data, or control information associated with various information channels (e.g., control channels, data channels, and information related to CSI RS in unlicensed spectrum, etc.). Information may be passed on to the CSI RS module 810, and to other components of wireless device 800. In some examples, the receiver 805 may receive the CSI RS according to the received signaling. In some examples, receiving the CSI RS includes receiving the CSI RS in a final TTI of a DL burst. Additionally or alternatively, receiving the CSI RS may include receiving a DL TTI burst that has a first CSI RS and a second CSI RS, such that CQI may include a first CQI computed based the first CSI RS, and a second CQI computed based on the second CSI RS. In some examples, the receiver 805 may receive the CSI RS during the second subframe.

The CSI RS module 810 may receive signaling indicative of a CSI RS presence, receive the CSI RS according to the received signaling, and compute a CQI based on CSI RS.

The transmitter 815 may transmit signals received from other components of wireless device 800. In some examples, the transmitter 815 may be collocated with the receiver 805 in a transceiver module. The transmitter 815 may include a single antenna, or it may include a plurality of antennas. In some examples, the transmitter 815 may transmit a report including the CQI, such that the report may include an indication that the CQI is based on the CSI RS.

Figure 9:
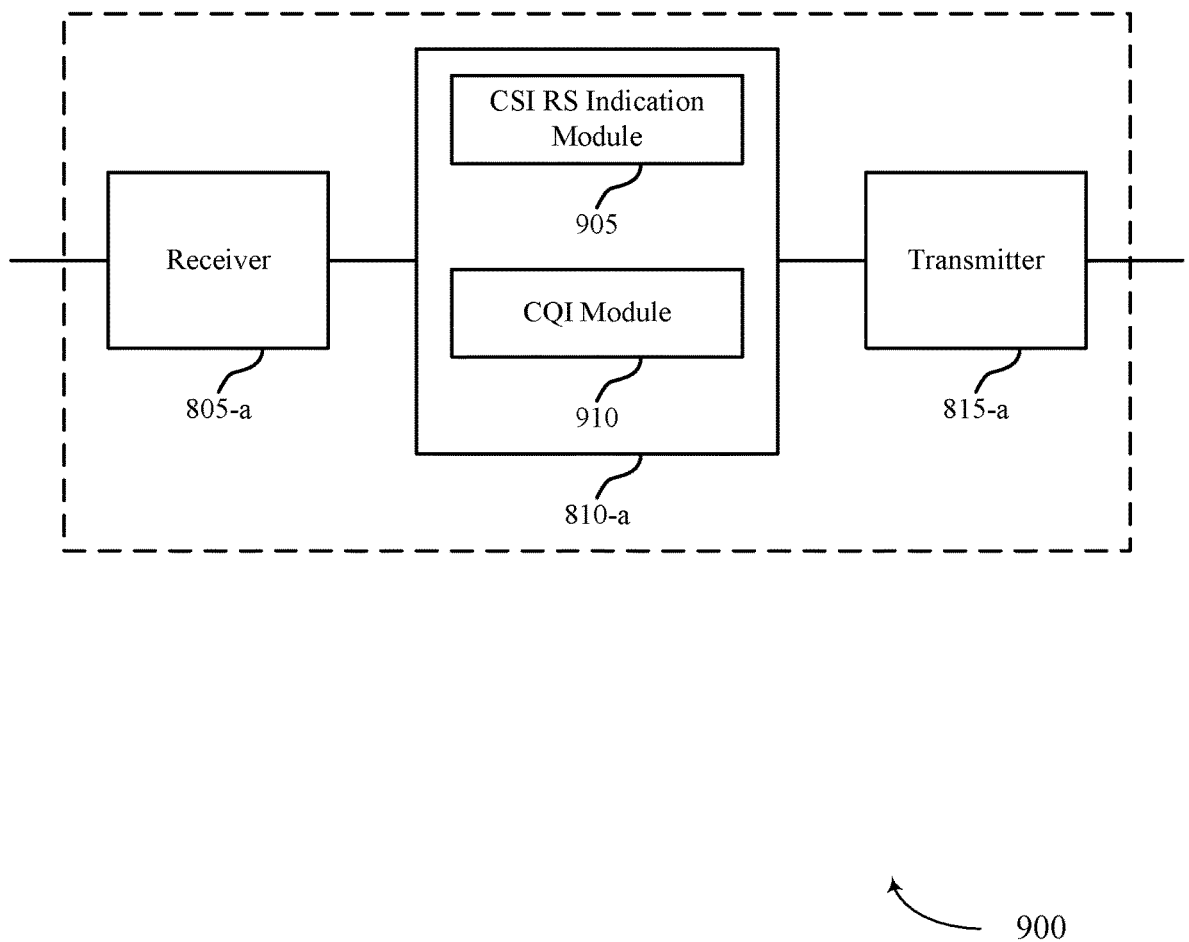

FIG. 9 shows a diagram of a wireless device 900 that supports CSI RS in contention-based spectrum in accordance with various aspects of the present disclosure. Wireless device 900 may be an example of aspects of a wireless device 800 or a UE 115 described with reference to FIGS. 1-8. Wireless device 900 may include a receiver 805-*a*, a CSI RS module 810-*a*, or a transmitter 815-*a*. Wireless device 900 may also include a processor. Each of these components may be in communication with one another. The CSI RS module 810-*a* may also include a CSI RS indication module 905, and a CQI module 910.

The receiver 805-*a* may receive information which may be passed on to CSI RS module 810-*a*, and to other components of wireless device 900. The CSI RS module 810-*a* may perform the operations described with reference to FIG. 8. The transmitter 815-*a* may transmit signals received from other components of wireless device 900.

The CSI RS indication module 905 may receive signaling indicative of a CSI RS presence as described with reference to FIGS. 2-7. In some examples, the signaling indicative of the CSI RS presence includes a physical channel. The signaling indicative of the CSI RS presence includes a portion of a PCFICH or a portion of a PFFICH, in various examples.

The CQI module 910 may compute a CQI based on CSI RS as described with reference to FIGS. 2-7. The CQI module 910 may also determine that the CQI was computed using the CSI RS based on transmitting the CSI RS. The CQI module 910 may also determine that the CQI was computed using the CSI RS based on an indicator received from a UE, such that the report may include the indicator.

Figure 10:
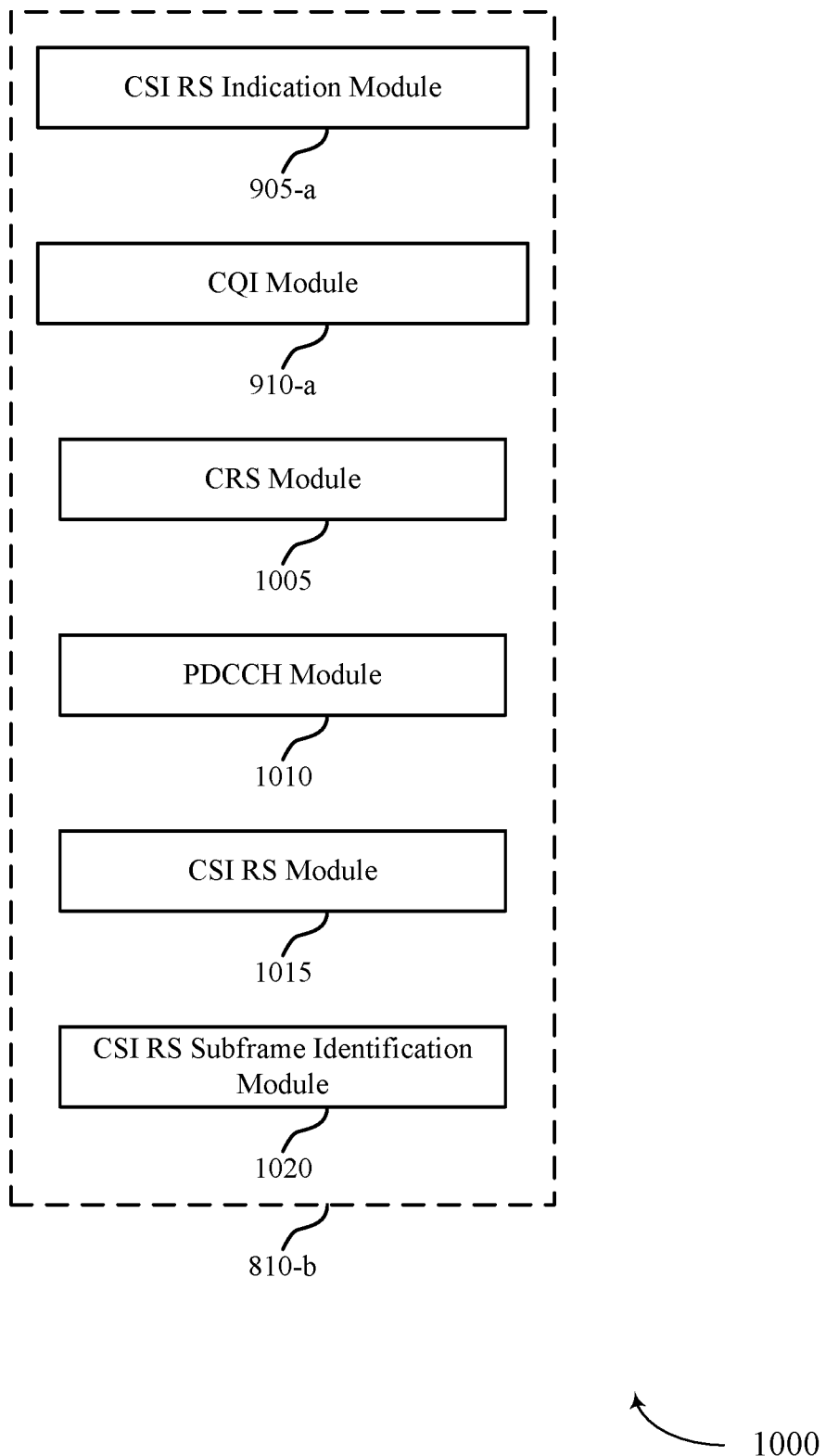

FIG. 10 shows a diagram 1000 of a CSI RS module 810-*b* which may be a component of a wireless device 800 or a wireless device 900 that supports CSI RS in contention-based spectrum in accordance with various aspects of the present disclosure. The CSI RS module 810-*b* may be an example of aspects of a CSI RS module 810 described with reference to FIGS. 8-9. The CSI RS module 810-*b* may include a CSI RS indication module 905-*a*, and a CQI module 910-*a*. Each of these modules may perform the functions described with reference to FIG. 9. The CSI RS module 810-*b* may also include a CRS module 1005, a PDCCH module 1010, a CSI RS module 1015, and a CSI RS subframe identification module 1020.

The CRS module 1005 may receive a CRS, and the CQI may be based on the CRS as described with reference to FIGS. 2-7. In some examples, receiving the CRS includes receiving a preamble including the CRS. The PDCCH module 1010 may receive a PDCCH, and the CSI RS may be received following the PDCCH as described with reference to FIGS. 2-7.

The CSI RS module 1015 may be configured such that the CSI RS may include a plurality of symbol periods as described with reference to FIGS. 2-7. In some examples, a density of the CSI RS may be based on an interference measurement gap.

The CSI RS subframe identification module 1020 may identify a first subframe (e.g., an anchor subframe) indicative of a CSI RS presence as described with reference to FIGS. 2-7. The CSI RS subframe identification module 1020 may also determine that a second subframe (e.g., CSI RS subframe) includes the CSI RS based on the identified first subframe and an offset. In some examples, determining frame information is based on a preamble or a PFFICH, or both, such that identifying the first subframe may include determining that the frame includes the first subframe based on the frame information and a periodicity of the first subframe. The CSI RS subframe identification module 1020 may also receive signaling indicative of the offset. In some examples, the offset may be a relative location of the second subframe in the frame. The CSI RS subframe identification module 1020 may also determine that a second subframe includes the CSI RS based on the identified first subframe and an offset.

Figure 11:
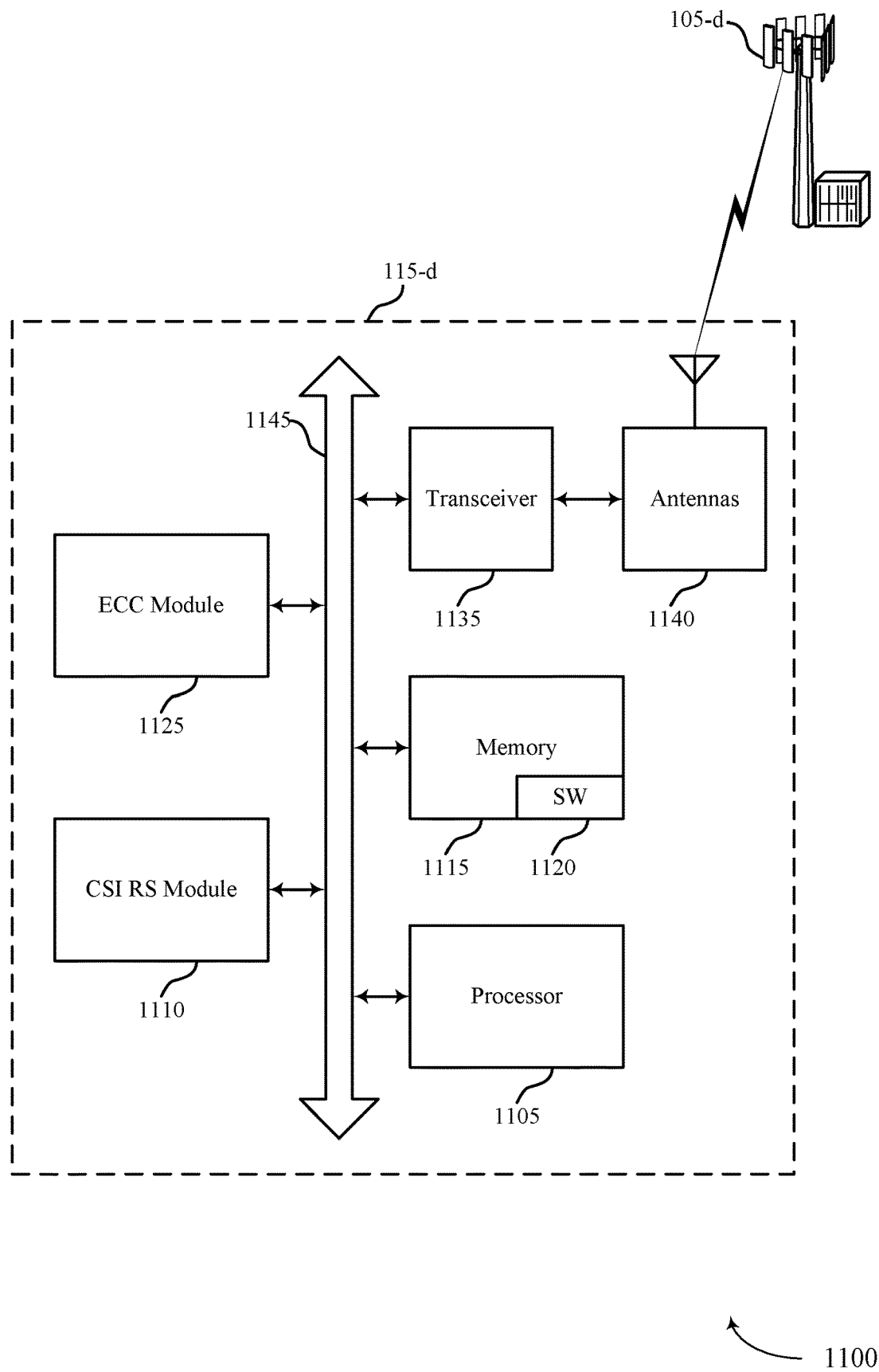
FIG. 11 illustrates a diagram of a system, including a user equipment (UE), that supports CSI RS in contention-based spectrum in accordance with various aspects of the present disclosure.

FIG. 11 shows a diagram of a system 1100, including a UE 115, that supports CSI RS in contention-based spectrum in accordance with various aspects of the present disclosure. System 1100 may include UE 115-d, which may be an example of a wireless device 800, a wireless device 900, or a UE 115 described with reference to FIGS. 1, 2 and 8-10. UE 115-d may include a CSI RS module 1110, which may be an example of a CSI RS module 810 described with reference to FIGS. 8-10. UE 115-d may also include an ECC module 1125. The ECC module 1125 may enable UE 115-d to operate according to ECC procedures as described with reference to FIG. 1. UE 115-d may also include components for bi-directional voice and data communications including components for transmitting communications and components for receiving communications. For example, UE 115-d may communicate bi-directionally with base station 105-d.

UE 115-d may also include a processor 1105, and memory 1115 (including software (SW) 1120), a transceiver 1135, and one or more antenna(s) 1140, each of which may communicate, directly or indirectly, with one another (e.g., via buses 1145). The transceiver 1135 may communicate bi-directionally, via the antenna(s) 1140 or wired or wireless links, with one or more networks, as described above. For example, the transceiver 1135 may communicate bi-directionally with a base station 105 or another UE 115. The transceiver 1135 may include a modem to modulate the packets and provide the modulated packets to the antenna(s) 1140 for transmission, and to demodulate packets received from the antenna(s) 1140. While UE 115-d may include a single antenna 1140, UE 115-d may also have multiple antennas 1140 capable of concurrently transmitting or receiving multiple wireless transmissions.

The memory 1115 may include random access memory (RAM) and read only memory (ROM). The memory 1115 may store computer-readable, computer-executable software/firmware code 1120 including instructions that, when executed, cause the processor 1105 to perform various functions described herein (e.g., CSI RS in unlicensed spectrum, etc.). Alternatively, the software/firmware code 1120 may not be directly executable by the processor 1105 but cause a computer (e.g., when compiled and executed) to perform functions described herein. The processor 1105 may include an intelligent hardware device, (e.g., a central processing unit (CPU), a microcontroller, an application specific integrated circuit (ASIC), etc.)

Figure 12:
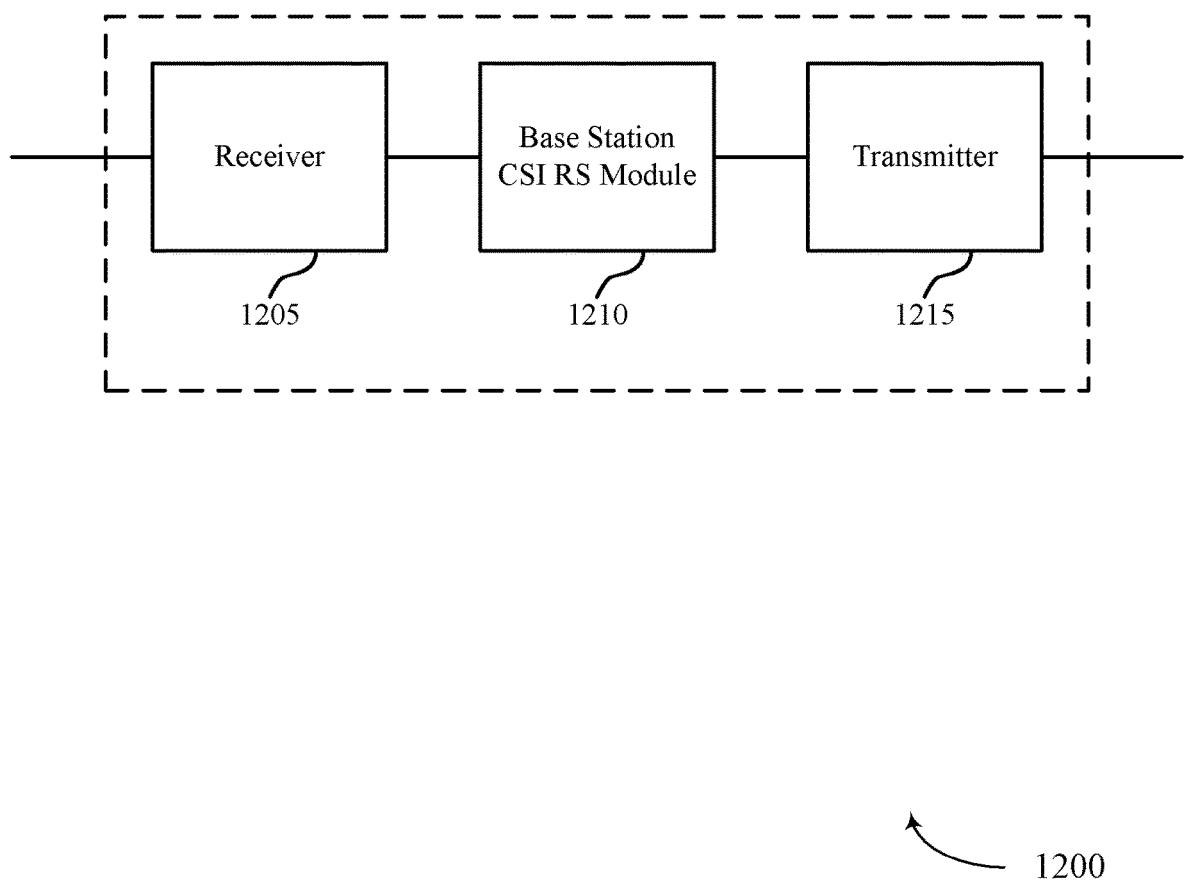
FIGS. 12-14 show diagrams of a wireless device or devices that supports CSI RS in contention-based spectrum in accordance with various aspects of the present disclosure.

FIG. 12 shows a diagram of a wireless device 1200 that supports CSI RS in contention-based spectrum in accordance with various aspects of the present disclosure. Wireless device 1200 may be an example of aspects of a base station 105 described with reference to FIGS. 1-11. Wireless device 1200 may include a receiver 1205, a base station CSI RS module 1210, or a transmitter 1215. Wireless device 1200 may also include a processor. Each of these components may be in communication with one another.

The receiver 1205 may receive information such as packets, user data, or control information associated with various information channels (e.g., control channels, data channels, and information related to CSI RS in unlicensed spectrum, etc.). Information may be passed on to the base station CSI RS module 1210, and to other components of wireless device 1200.

The base station CSI RS module 1210 may transmit signaling indicative of a CSI RS presence, transmit the CSI RS according to the signaling, and receive a report including CQI computed based on the CSI RS.

The transmitter 1215 may transmit signals received from other components of wireless device 1200. In some examples, the transmitter 1215 may be collocated with the receiver 1205 in a transceiver module. The transmitter 1215 may include a single antenna, or it may include a plurality of antennas. In some examples, the transmitter 1215 may transmit the CSI RS according to the signaling. In some examples, the transmitter 1215 may transmit the CSI RS during the second subframe.

Figure 13:
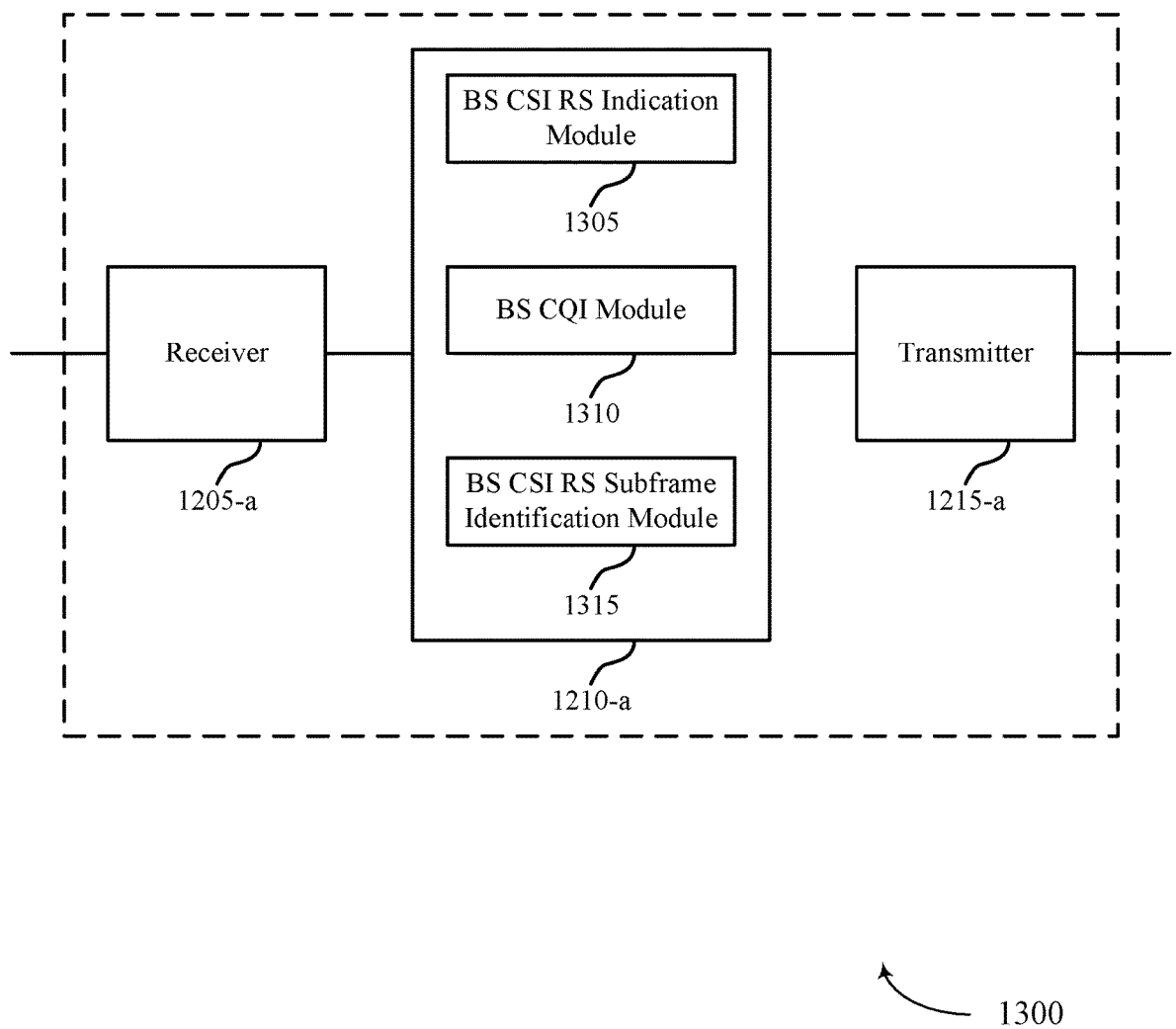

FIG. 13 shows a diagram of a wireless device 1300 that supports CSI RS in contention-based spectrum in accordance with various aspects of the present disclosure. Wireless device 1300 may be an example of aspects of a wireless device 1200 or a base station 105 described with reference to FIGS. 1-12. Wireless device 1300 may include a receiver 1205-a, a base station CSI RS module 1210-a, or a transmitter 1215-a. Wireless device 1300 may also include a processor. Each of these components may be in communication with one another. The base station CSI RS module 1210-a may also include a base station CSI RS indication module 1305, a base station CQI module 1310, and a base station CSI RS subframe identification module 1315.

The receiver 1205-a may receive information which may be passed on to base station CSI RS module 1210-a, and to other components of wireless device 1300. The base station CSI RS module 1210-a may perform the operations described with reference to FIG. 12. The transmitter 1215-a may transmit signals received from other components of wireless device 1300.

The base station CSI RS indication module 1305 may transmit signaling indicative of a CSI RS presence as described with reference to FIGS. 2-7. The base station CQI module 1310 may receive a report including CQI computed based on the CSI RS as described with reference to FIGS. 2-7. The base station CSI RS subframe identification module 1315 may identify a first subframe indicative of a channel CSI RS presence as described with reference to FIGS. 2-7.

Figure 14:
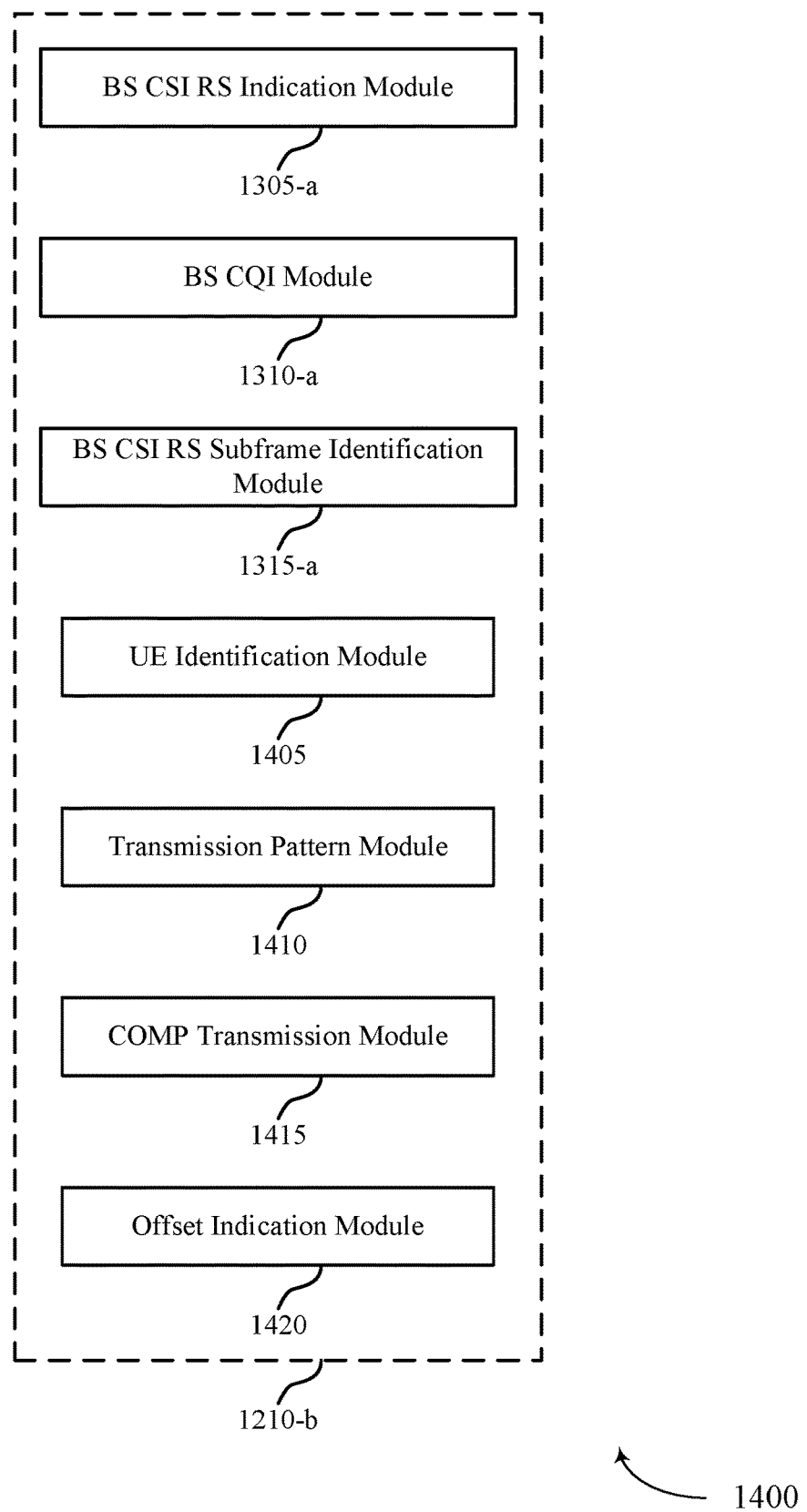

FIG. 14 shows a diagram 1400 of a base station CSI RS module 1210-b which may be a component of a wireless device 1200 or a wireless device 1300 that supports CSI RS in contention-based spectrum in accordance with various aspects of the present disclosure. The base station CSI RS module 1210-*b* may be an example of aspects of a base station CSI RS module 1210 described with reference to FIGS. 12-13. The base station CSI RS module 1210-*b* may include a base station CSI RS indication module 1305-*a*, a base station CQI module 1310-*a*, and a base station CSI RS subframe identification module 1315-*a*. Each of these modules may perform the functions described with reference to FIG. 13. The base station CSI RS module 1210-*b* may also include a UE identification module 1405, a transmission pattern module 1410, a COMP transmission module 1415, and an offset indication module 1420.

The UE identification module 1405 may identify a UE configured for CSI RS based CQI reporting; and the signaling may be transmitted based on identifying the UE as described with reference to FIGS. 2-7. The transmission pattern module 1410 may determine a transmission pattern for serving a UE in a CoMP scheme as described with reference to FIGS. 2-7. The COMP transmission module 1415 may transmit the CSI RS and the signaling based on the transmission pattern as described with reference to FIGS. 2-7. The offset indication module 1420 may transmit signaling indicative of the offset as described with reference to FIGS. 2-7. In some examples, the offset includes a relative location of, e.g., a CSI RS subframe in a frame.

Figure 15:
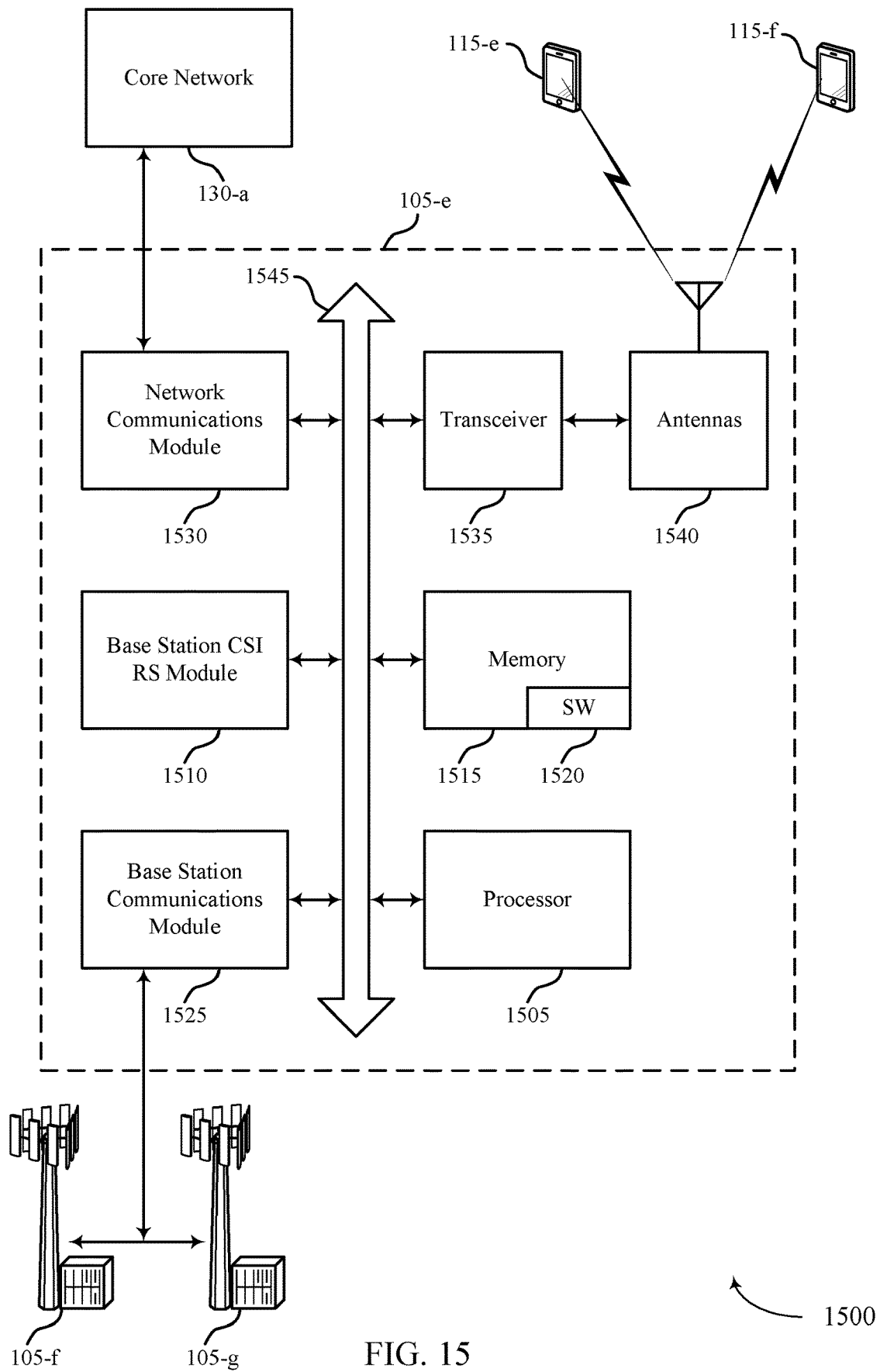
FIG. 15 illustrates a diagram of a system, including a base station, that supports CSI RS in contention-based spectrum in accordance with various aspects of the present disclosure.

FIG. 15 shows a diagram of a system 1500, including a base station 105, that supports CSI RS in contention-based spectrum in accordance with various aspects of the present disclosure. System 1500 may include base station 105-*e*, which may be an example of a wireless device 1200, a wireless device 1300, or a base station 105 described with reference to FIGS. 1, 2, and 12-14. Base station 105-*e* may include a base station CSI RS module 1510, which may be an example of a base station CSI RS module 1210 described with reference to FIGS. 12-14. Base station 105-*e* may also include components for bi-directional voice and data communications including components for transmitting communications and components for receiving communications. For example, base station 105-*e* may communicate bi-directionally with UE 115-*e* or UE 115-*f*.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*f* and base station 105-*g* via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communications module 1525. In some examples, base station communications module 1525 may provide an X2 interface within a Long Term Evolution (LTE)/LTE-A wireless communication network technology to provide communication between some of the base stations 105. In some examples, base station 105-*e* may communicate with other base stations through core network 130. In some cases, base station 105-*e* may communicate with the core network 130 through network communications module 1530.

The base station 105-*e* may include a processor 1505, memory 1515 (including software (SW) 1520), transceiver 1535, and antenna(s) 1540, which each may be in communication, directly or indirectly, with one another (e.g., over bus system 1545). The transceivers 1535 may be configured to communicate bi-directionally, via the antenna(s) 1540, with the UEs 115, which may be multi-mode devices. The transceiver 1535 (or other components of the base station 105-*e*) may also be configured to communicate bi-directionally, via the antennas 1540, with one or more other base stations (not shown). The transceiver 1535 may include a modem configured to modulate the packets and provide the modulated packets to the antennas 1540 for transmission, and to demodulate packets received from the antennas 1540. The base station 105-*e* may include multiple transceivers 1535, each with one or more associated antennas 1540. The transceiver may be an example of a combined receiver 1205 and transmitter 1215 of FIG. 12.

The memory 1515 may include RAM and ROM. The memory 1515 may also store computer-readable, computer-executable software code 1520 containing instructions that are configured to, when executed, cause the processor 1505 to perform various functions described herein (e.g., CSI RS in unlicensed spectrum, selecting coverage enhancement techniques, call processing, database management, message routing, etc.). Alternatively, the software 1520 may not be directly executable by the processor 1505 but be configured to cause the computer (e.g., when compiled and executed) to perform functions described herein. The processor 1505 may include an intelligent hardware device (e.g., a CPU, a microcontroller, an ASIC, etc.). The processor 1505 may include various special purpose processors such as encoders, queue processing modules, base band processors, radio head controllers, digital signal processor (DSPs), and the like.

The base station communications module 1525 may manage communications with other base stations 105. In some cases, a communications management module may include a controller or scheduler for controlling communications with UEs 115 in cooperation with other base stations 105. For example, the base station communications module 1525 may coordinate scheduling for transmissions to UEs 115 for various interference mitigation techniques such as beamforming or joint transmission.

The components of wireless device 800, wireless device 900, and CSI RS module 810 wireless device 1200, wireless device 1300, base station CSI RS module 1210, and system 1500 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 16:
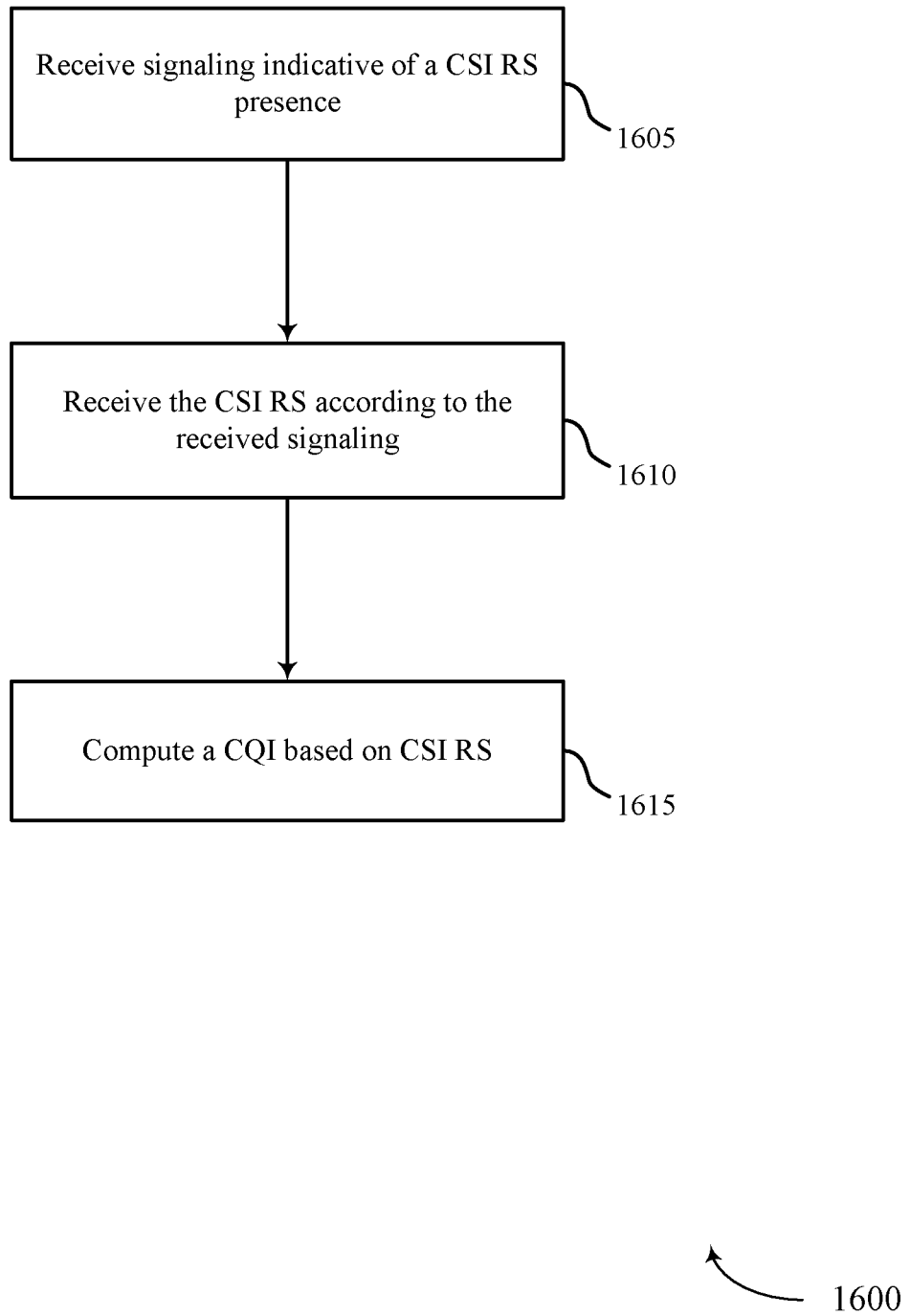
FIGS. 16-22 illustrate methods for CSI RS in contention-based spectrum in accordance with various aspects of the present disclosure.

FIG. 16 shows a flowchart illustrating a method 1600 for CSI RS in contention-based spectrum in accordance with various aspects of the present disclosure. The operations of method 1600 may be implemented by a UE 115 or its components as described with reference to FIGS. 1-15. For example, the operations of method 1600 may be performed by the CSI RS module 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware.

At block 1605, the UE 115 may receive signaling indicative of a CSI RS presence as described with reference to FIGS. 2-7. In certain examples, the operations of block 1605 may be performed by the CSI RS indication module 905 as described with reference to FIG. 9.

At block 1610, the UE 115 may receive the CSI RS according to the received signaling as described with reference to FIGS. 2-7. In certain examples, the operations of block 1610 may be performed by the receiver 805 as described with reference to FIG. 8.

At block 1615, the UE 115 may compute a CQI based at least in part on CSI RS as described with reference to FIGS. 2-7. In certain examples, the operations of block 1615 may be performed by the CQI module 910 as described with reference to FIG. 9.

Figure 17:
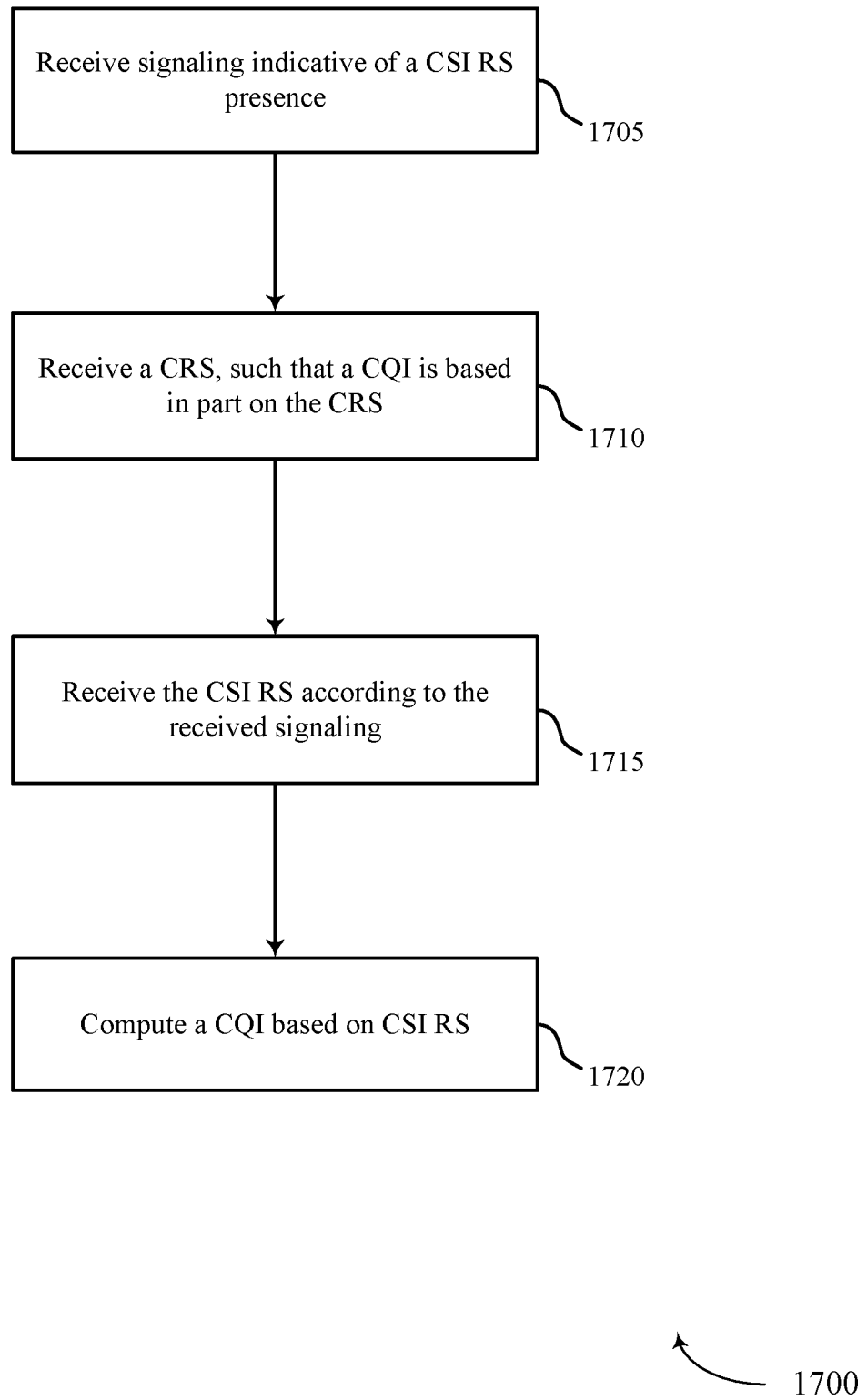

FIG. 17 shows a flowchart illustrating a method 1700 for CSI RS in contention-based spectrum in accordance with various aspects of the present disclosure. The operations of method 1700 may be implemented by a UE 115 or its components as described with reference to FIGS. 1-15. For example, the operations of method 1700 may be performed by the CSI RS module 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of method 1600 of FIG. 16.

At block 1705, the UE 115 may receive signaling indicative of a CSI RS presence as described with reference to FIGS. 2-7. In certain examples, the operations of block 1705 may be performed by the CSI RS indication module 905 as described with reference to FIG. 9.

At block 1710, the UE 115 may receive a CRS, such that the CQI may be based at least in part on the CRS as described with reference to FIGS. 2-7. In certain examples, the operations of block 1710 may be performed by the CRS module 1005 as described with reference to FIG. 10.

At block 1715, the UE 115 may receive the CSI RS according to the received signaling as described with reference to FIGS. 2-7. In certain examples, the operations of block 1715 may be performed by the receiver 805 as described with reference to FIG. 8.

At block 1720, the UE 115 may compute a CQI based at least in part on CSI RS as described with reference to FIGS. 2-7. In certain examples, the operations of block 1720 may be performed by the CQI module 910 as described with reference to FIG. 9.

Figure 18:
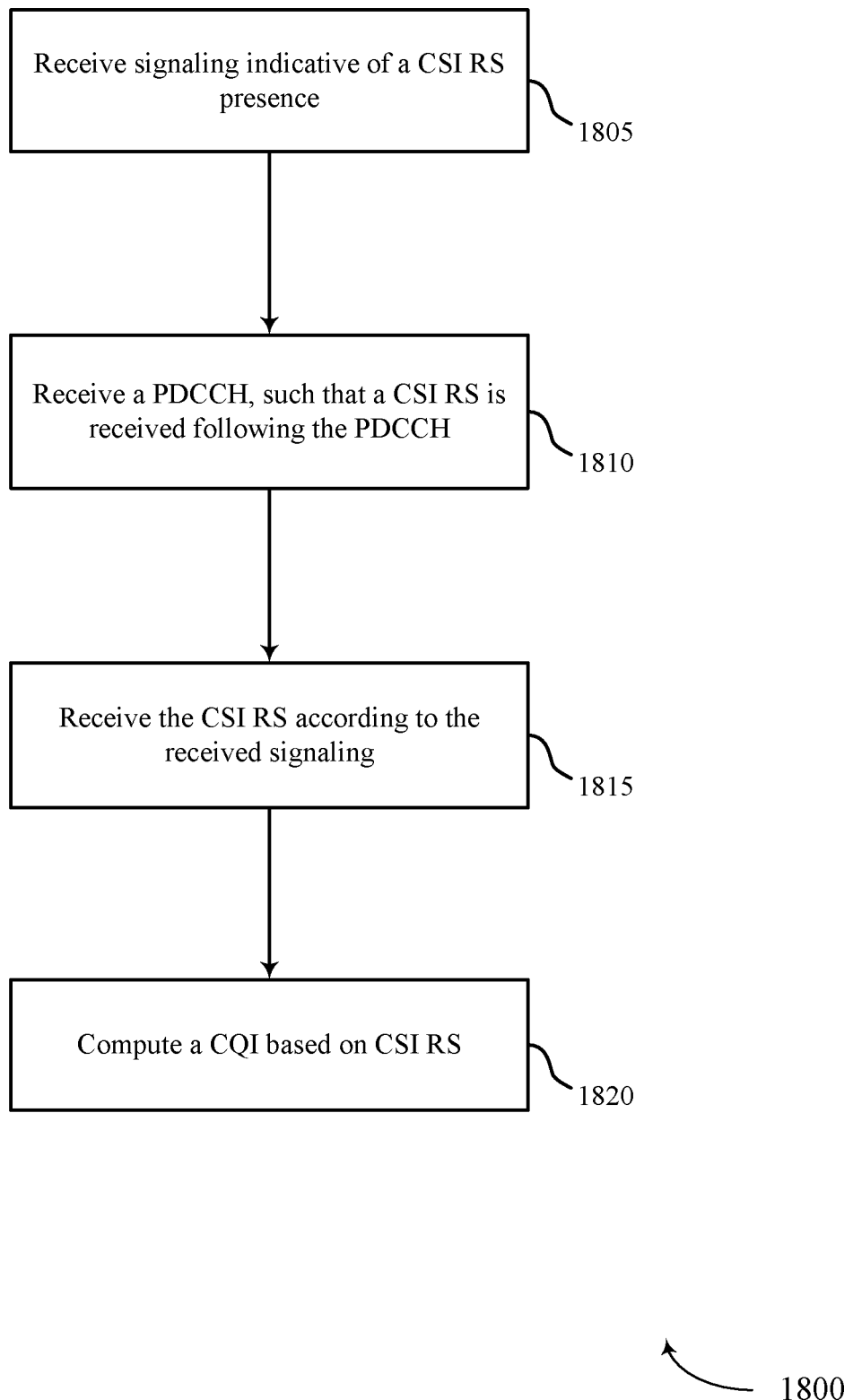

FIG. 18 shows a flowchart illustrating a method 1800 for CSI RS in contention-based spectrum in accordance with various aspects of the present disclosure. The operations of method 1800 may be implemented by a UE 115 or its components as described with reference to FIGS. 1-15. For example, the operations of method 1800 may be performed by the CSI RS module 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1600, and 1700 of FIGS. 16-17.

At block 1805, the UE 115 may receive signaling indicative of a CSI RS presence as described with reference to FIGS. 2-7. In certain examples, the operations of block 1805 may be performed by the CSI RS indication module 905 as described with reference to FIG. 9.

At block 1810, the UE 115 may receive a PDCCH, such that the CSI RS may be received following the PDCCH as described with reference to FIGS. 2-7. In certain examples, the operations of block 1810 may be performed by the PDCCH module 1010 as described with reference to FIG. 10.

At block 1815, the UE 115 may receive the CSI RS according to the received signaling as described with reference to FIGS. 2-7. In certain examples, the operations of block 1815 may be performed by the receiver 805 as described with reference to FIG. 8.

At block 1820, the UE 115 may compute a CQI based at least in part on CSI RS as described with reference to FIGS. 2-7. In certain examples, the operations of block 1820 may be performed by the CQI module 910 as described with reference to FIG. 9.

Figure 19:
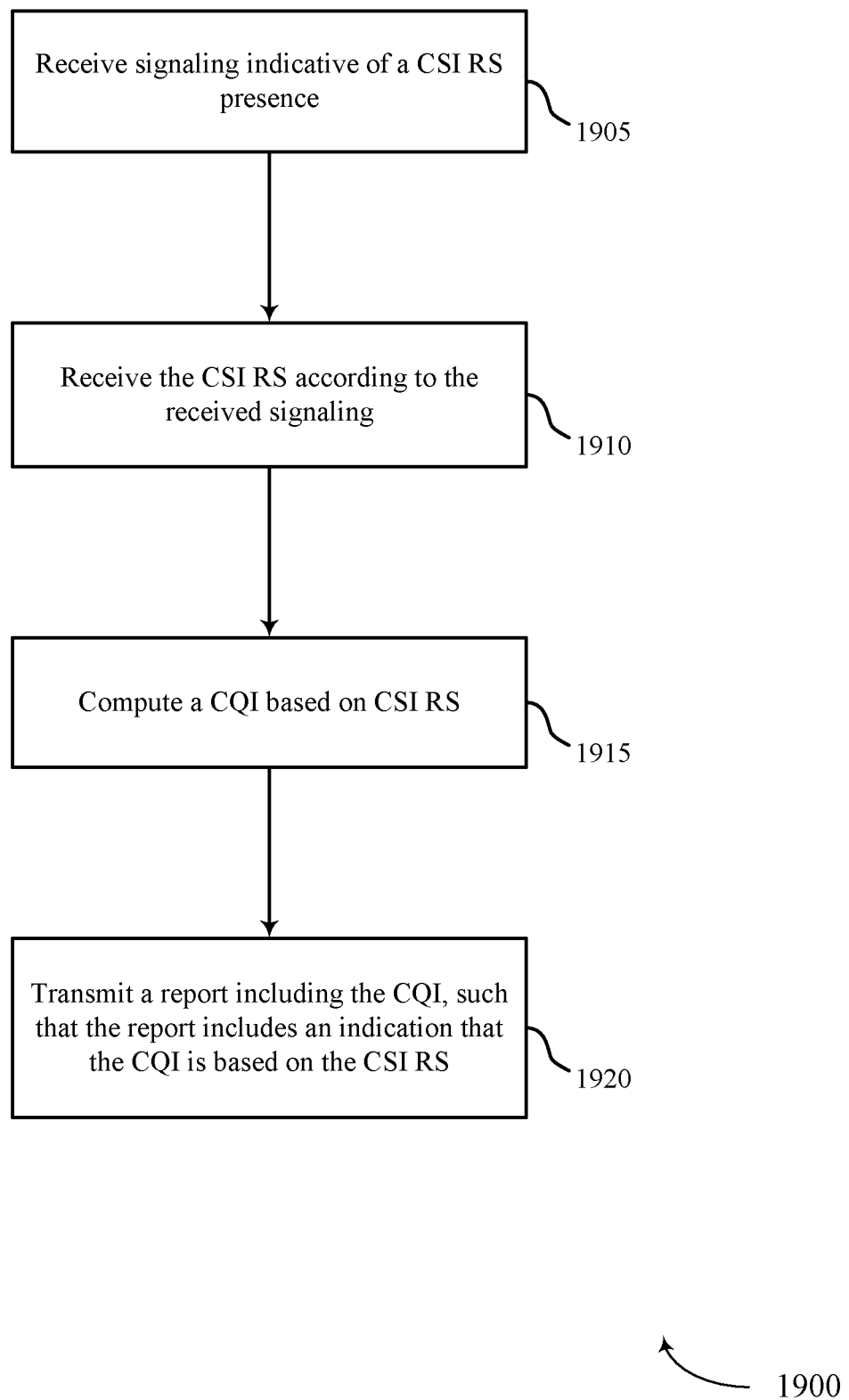

FIG. 19 shows a flowchart illustrating a method 1900 for CSI RS in contention-based spectrum in accordance with various aspects of the present disclosure. The operations of method 1900 may be implemented by a UE 115 or its components as described with reference to FIGS. 1-15. For example, the operations of method 1900 may be performed by the CSI RS module 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1600, 1700, and 1800 of FIGS. 16-18.

At block 1905, the UE 115 may receive signaling indicative of a CSI RS presence as described with reference to FIGS. 2-7. In certain examples, the operations of block 1905 may be performed by the CSI RS indication module 905 as described with reference to FIG. 9.

At block 1910, the UE 115 may receive the CSI RS according to the received signaling as described with reference to FIGS. 2-7. In certain examples, the operations of block 1910 may be performed by the receiver 805 as described with reference to FIG. 8.

At block 1915, the UE 115 may compute a CQI based at least in part on CSI RS as described with reference to FIGS. 2-7. In certain examples, the operations of block 1915 may be performed by the CQI module 910 as described with reference to FIG. 9.

At block 1920, the UE 115 may transmit a report including the CQI, and the report may include an indication that the CQI is based at least in part on the CSI RS as described with reference to FIGS. 2-7. In certain examples, the operations of block 1920 may be performed by the transmitter 815 as described with reference to FIG. 8.

Figure 20:
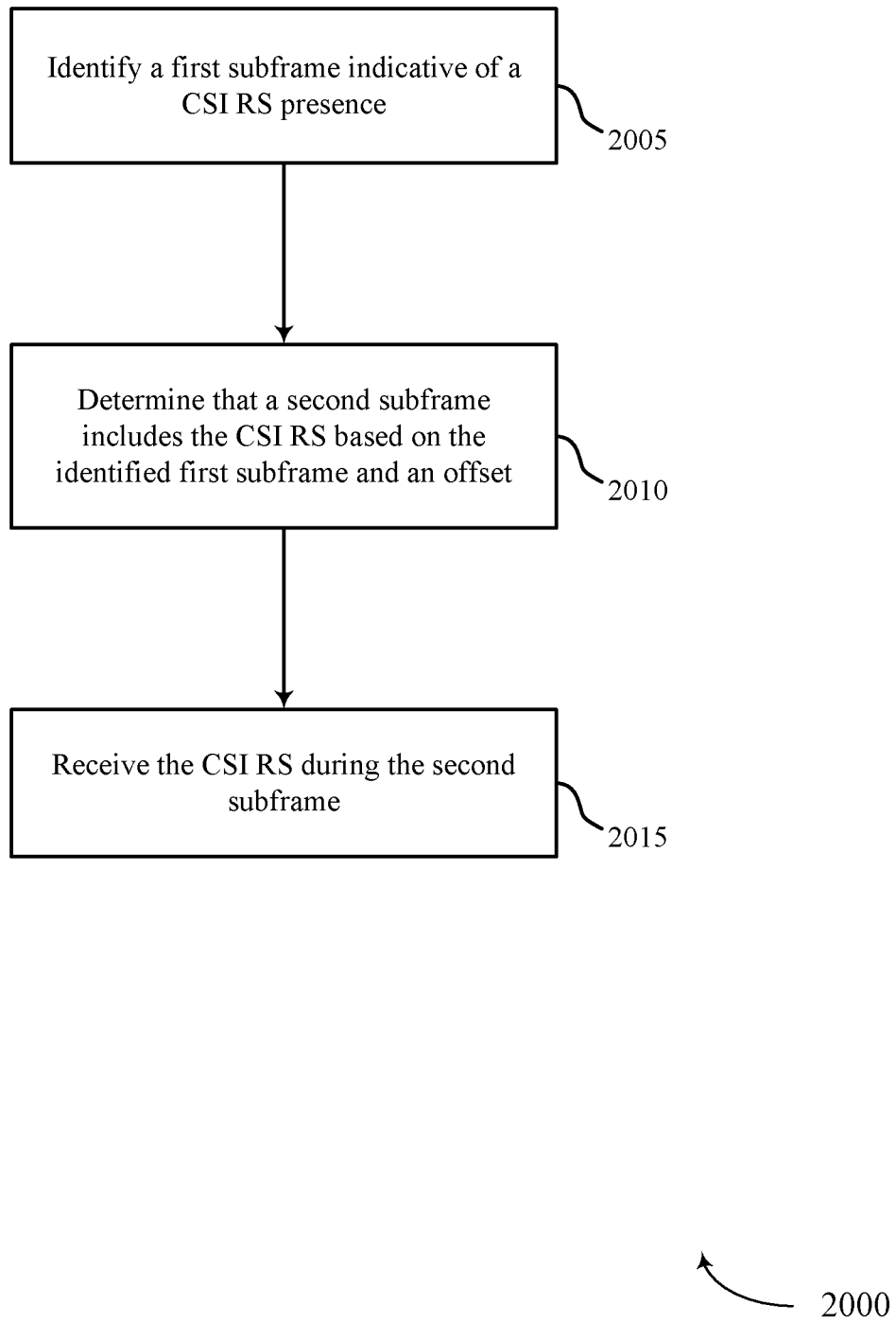

FIG. 20 shows a flowchart illustrating a method 2000 for CSI RS in contention-based spectrum in accordance with various aspects of the present disclosure. The operations of method 2000 may be implemented by a UE 115 or its components as described with reference to FIGS. 1-15. For example, the operations of method 2000 may be performed by the CSI RS module 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware. The method 2000 may also incorporate aspects of methods 1600, 1700, 1800, and 1900 of FIGS. 16-19.

At block 2005, the UE 115 may identify a first subframe indicative of a CSI RS presence as described with reference to FIGS. 2-7. In certain examples, the operations of block 2005 may be performed by the CSI RS subframe identification module 1020 as described with reference to FIG. 10.

At block 2010, the UE 115 may determine that a second subframe includes the CSI RS based at least in part on the identified first subframe and an offset as described with reference to FIGS. 2-7. In certain examples, the operations of block 2010 may be performed by the CSI RS subframe identification module 1020 as described with reference to FIG. 10.

At block 2015, the UE 115 may receive the CSI RS during the second subframe as described with reference to FIGS. 2-7. In certain examples, the operations of block 2015 may be performed by the receiver 805 as described with reference to FIG. 8.

Figure 21:
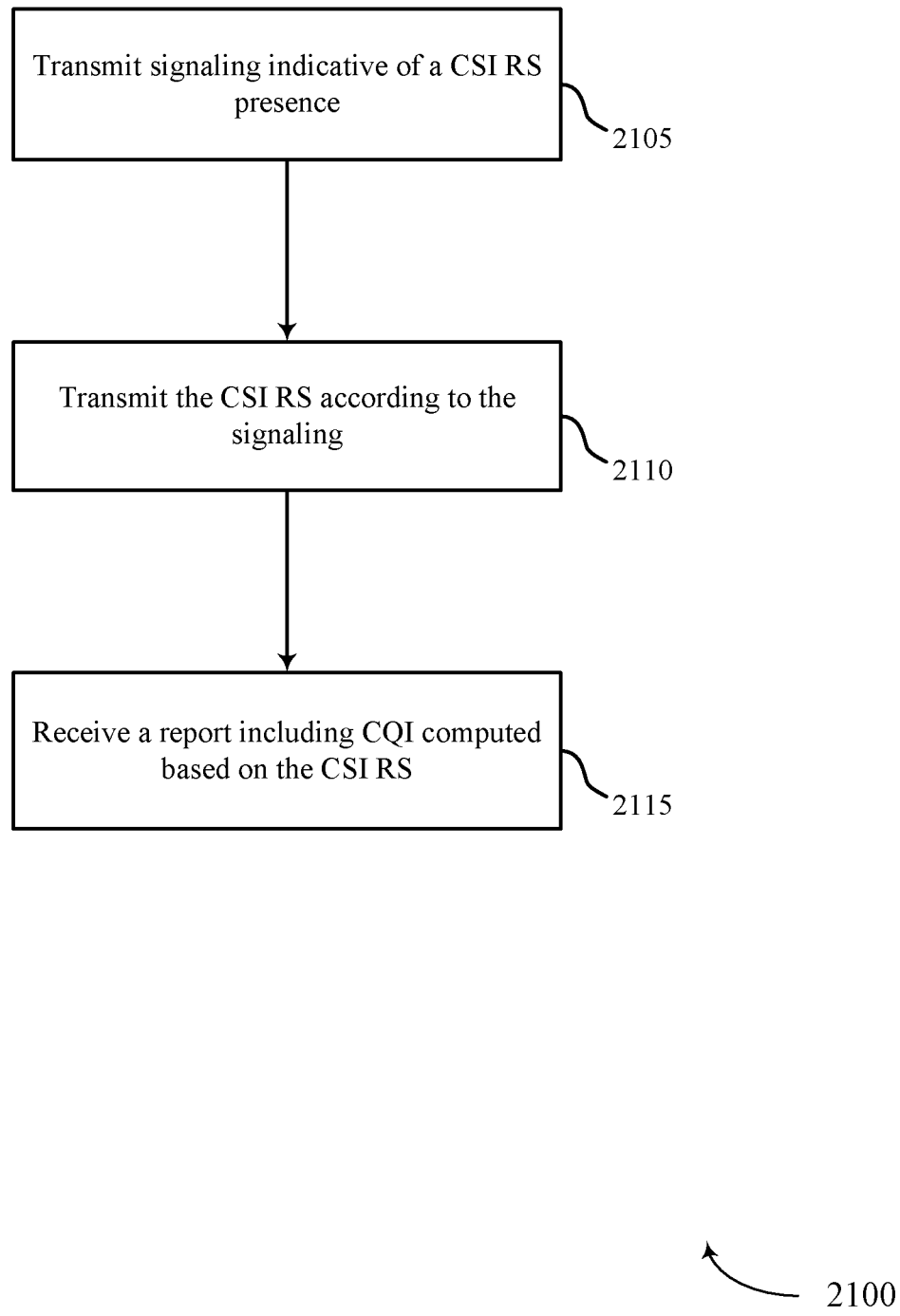

FIG. 21 shows a flowchart illustrating a method 2100 for CSI RS in contention-based spectrum in accordance with various aspects of the present disclosure. The operations of method 2100 may be implemented by a base station 105 or its components as described with reference to FIGS. 1-15. For example, the operations of method 2100 may be performed by the base station CSI RS module 1210 as described with reference to FIGS. 12-15. In some examples, a base station 105 may execute a set of codes to control the functional elements of the base station 105 to perform the functions described below. Additionally or alternatively, the base station 105 may perform aspects the functions described below using special-purpose hardware.

At block 2105, the base station 105 may transmit signaling indicative of a CSI RS presence as described with reference to FIGS. 2-7. In certain examples, the operations of block 2105 may be performed by the base station CSI RS indication module 1305 as described with reference to FIG. 13.

At block 2110, the base station 105 may transmit the CSI RS according to the signaling as described with reference to FIGS. 2-7. In certain examples, the operations of block 2110 may be performed by the transmitter 1215 as described with reference to FIG. 12.

At block 2115, the base station 105 may receive a report including CQI computed based at least in part on the CSI RS as described with reference to FIGS. 2-7. In certain examples, the operations of block 2115 may be performed by the base station CQI module 1310 as described with reference to FIG. 13.

Figure 22:
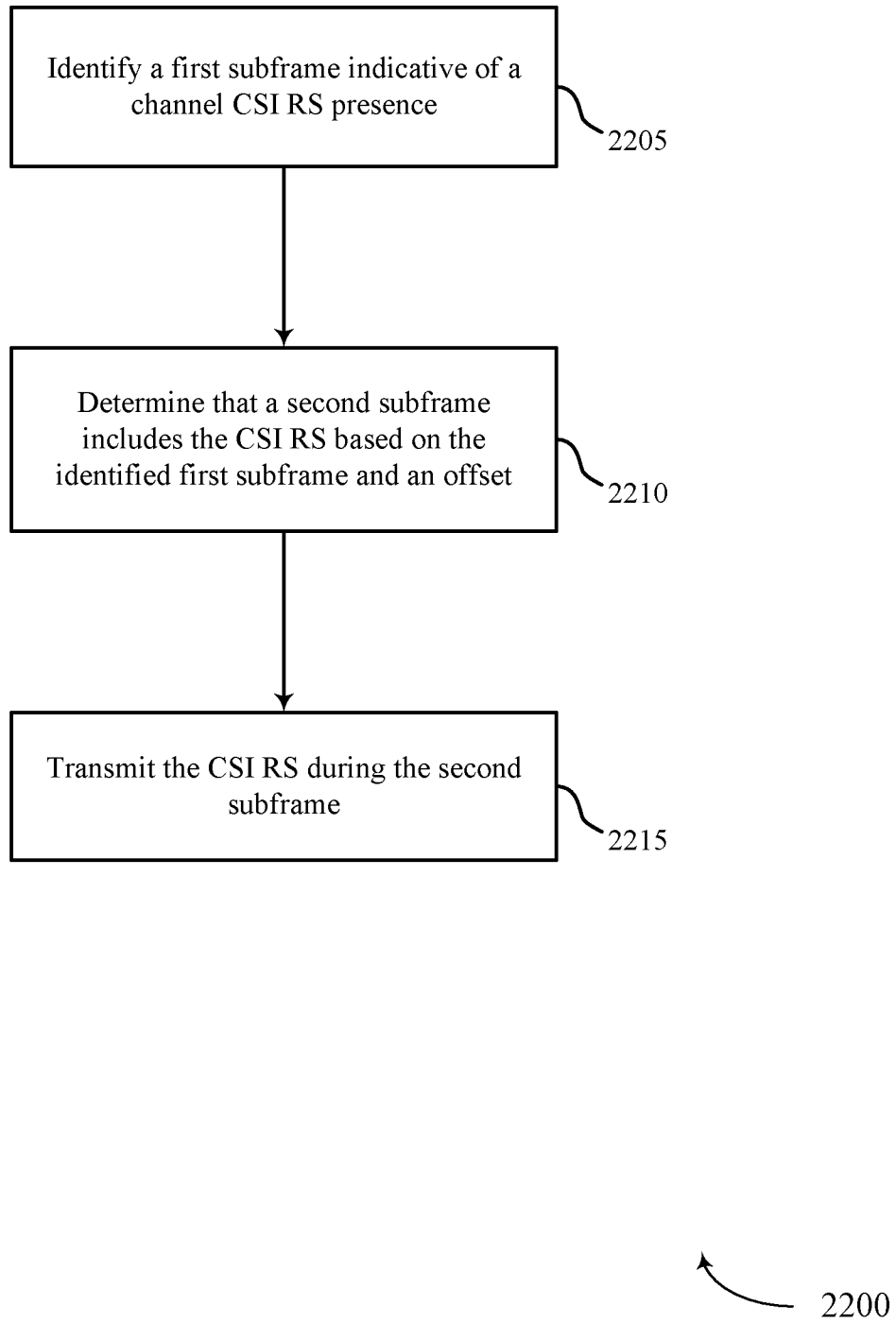

FIG. 22 shows a flowchart illustrating a method 2200 for CSI RS in contention-based spectrum in accordance with various aspects of the present disclosure. The operations of method 2200 may be implemented by a base station 105 or its components as described with reference to FIGS. 1-15. For example, the operations of method 2200 may be performed by the base station CSI RS module 1210 as described with reference to FIGS. 12-15. In some examples, a base station 105 may execute a set of codes to control the functional elements of the base station 105 to perform the functions described below. Additionally or alternatively, the base station 105 may perform aspects the functions described below using special-purpose hardware.

At block 2205, the base station 105 may identify a first subframe indicative of a channel CSI RS presence as described with reference to FIGS. 2-7. In certain examples, the operations of block 2205 may be performed by the base station CSI RS subframe identification module 1315 as described with reference to FIG. 13.

At block 2210, the base station 105 may determine that a second subframe includes the CSI RS based at least in part on the identified first subframe and an offset as described with reference to FIGS. 2-7. In certain examples, the operations of block 2210 may be performed by the CSI RS subframe identification module 1020 as described with reference to FIG. 10.

At block 2215, the base station 105 may transmit the CSI RS during the second subframe as described with reference to FIGS. 2-7. In certain examples, the operations of block 2215 may be performed by the transmitter 1215 as described with reference to FIG. 12.

Thus, methods 1600, 1700, 1800, 1900, 2000, 2100, and 2200 may provide for CSI RS in unlicensed spectrum. It should be noted that methods 1600, 1700, 1800, 1900, 2000, 2100, and 2200 describe possible implementation, and that the operations and the steps may be rearranged or otherwise modified such that other implementations are possible. In some examples, aspects from two or more of the methods 1600, 1700, 1800, 1900, 2000, 2100, and 2200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
receiving an indication of an offset for channel state information (CSI) reference signals within a transmission time interval (TTI) structure, the offset representing a relative location for the CSI reference signals within the TTI structure;
detecting, in a contention-based spectrum, after receiving the indication of the offset, signaling indicative of a transmission in the contention-based spectrum according to the TTI structure;
determining, based at least in part on detecting the signaling indicative of the transmission in the contention-based spectrum, to monitor for a CSI reference signal in the contention-based spectrum at the relative location within the TTI structure identified by the indicated offset;
receiving, based at least in part on the monitoring, the CSI reference signal in the contention-based spectrum at the relative location within the TTI structure identified by the indicated offset;
computing a channel quality indicator (CQI) based at least in part on the CSI reference signal; and
transmitting a report comprising the CQI and an indicator indicating that the CQI is based at least in part on the CSI reference signal received in the contention-based spectrum.

2. The method of claim 1, further comprising:
receiving a cell-specific reference signal (CRS), wherein the CQI is based at least in part on the CSI reference signal and the CRS.

3. The method of claim 1, wherein the signaling indicative of the transmission in the contention-based spectrum according to the TTI structure comprises a physical channel of the transmission in the contention-based spectrum according to the TTI structure.

4. The method of claim 3, wherein the signaling indicative of the transmission in the contention-based spectrum according to the TTI structure comprises a portion of a physical control format indicator channel (PCFICH) of the transmission in the contention-based spectrum according to the TTI structure or a portion of a physical frame format indicator channel (PFFICH) of the transmission in the contention-based spectrum according to the TTI structure.

5. The method of claim 3, wherein the signaling indicative of the transmission in the contention-based spectrum according to the TTI structure comprises a portion of a physical downlink control channel (PDCCH) of the transmission in the contention-based spectrum according to the TTI structure.

6. The method of claim 1, wherein the CSI reference signal comprises a plurality of symbol periods.

7. The method of claim 6, wherein a density of the CSI reference signal is based at least in part on an interference measurement gap.

8. The method of claim 1, wherein receiving the CSI reference signal in the contention-based spectrum comprises:
receiving the CSI reference signal in a final transmission time interval (TTI) of a downlink (DL) burst.

9. The method of claim 1, wherein receiving the CSI reference signal in the contention-based spectrum comprises:
receiving a downlink (DL) burst comprising a first CSI reference signal and a second CSI reference signal, wherein the CQI comprises a first CQI computed based at least in part on the first CSI reference signal and a second CQI computed based at least in part on the second CSI reference signal.

10. The method of claim 1, wherein receiving the indication of the offset for CSI reference signals within the TTI structure comprises:
receiving the indication of the offset for CSI reference signals in radio resource control (RRC) signaling.

11. The method of claim 1, wherein detecting the signaling indicative of the transmission in the contention-based spectrum according to the TTI structure comprises:
detecting, in the contention-based spectrum, a preamble of the transmission in the contention-based spectrum according to the TTI structure.

12. A method of wireless communication, comprising:
transmitting an indication of an offset for channel state information (CSI) reference signals within a transmission time interval (TTI) structure, the offset representing a relative location for the CSI reference signals within the TTI structure;

determining, after transmitting the indication of the offset, that a contention-based spectrum is available for transmission;

transmitting, based at least in part on the determining and after transmitting the indication of the offset, signaling indicative of a transmission according to the TTI structure in the contention-based spectrum;

transmitting, in the transmission according to the TTI structure, a CSI reference signal in the contention-based spectrum at the relative location within the TTI structure identified by the indicated offset; and receiving a report comprising a channel quality indicator (CQI) computed based at least in part on the transmitted CSI reference signal and an indicator indicating that the CQI is based at least in part on the transmitted CSI reference signal.

13. The method of claim 12, further comprising:
identifying a user equipment (UE) configured for CSI reference signal based CQI reporting, wherein the signaling is transmitted in the contention-based spectrum based at least in part on identifying the UE.

14. The method of claim 12, further comprising:
determining that the CQI was computed using the CSI reference signal based at least in part on transmitting the CSI reference signal in the contention-based spectrum.

15. The method of claim 12, further comprising:
determining that the CQI was computed using the CSI reference signal based at least in part on the indicator indicating that the CQI is based at least in part on the transmitted CSI reference signal.

16. The method of claim 12, further comprising:
determining a transmission pattern for serving a UE in coordinated multiple point (CoMP) scheme; and
transmitting the CSI reference signal in the contention-based spectrum and the signaling based at least in part on the transmission pattern.

17. The method of claim 12, wherein:
transmitting the CSI reference signal in the contention-based spectrum comprises transmitting a downlink (DL) burst in the contention-based spectrum comprising a first CSI reference signal directed to a first user equipment (UE) and a second CSI reference signal directed to a second UE according to the signaling; and
receiving the report comprising the CQI comprises receiving a first report comprising first CQI computed by the first UE based at least in part on the first CSI reference signal and receiving a second report comprising second CQI computed by the second UE based at least in part on the second CSI reference signal.

18. An apparatus for wireless communication, comprising:
a processor;
memory in electronic communication with the processor; and
instructions stored in the memory and operable, when executed by the processor, to cause the apparatus to:
receive an indication of an offset for channel state information (CSI) reference signals within a transmission time interval (TTI) structure, the offset representing a relative location for the CSI reference signals within the TTI structure;
detect, in a contention-based spectrum, after receiving the indication of the offset, signaling indicative of a transmission in the contention-based spectrum according to the TTI structure;
determine, based at least in part on receiving the signaling indicative of the transmission in the contention-based spectrum, to monitor for a CSI reference signal in the contention-based spectrum at the relative location within the TTI structure identified by the indicated offset;
receive, based at least in part on the monitoring, the CSI reference signal in the contention-based spectrum at the relative location within the TTI structure identified by the indicated offset;
compute a channel quality indicator (CQI) based at least in part on the CSI reference signal; and
transmitting a report comprising the CQI and an indicator indicating that the CQI is based at least in part on the CSI reference signal received in the contention-based spectrum.

19. The apparatus of claim 18, wherein the instructions are operable to cause the apparatus to:
receive a cell-specific reference signal (CRS), wherein the CQI is based at least in part on the CSI reference signal and the CRS.

20. The apparatus of claim 18, wherein the signaling indicative of the transmission in the contention-based spectrum according to the TTI structure comprises a physical channel of the transmission in the contention-based spectrum according to the TTI structure.

21. The apparatus of claim 18, wherein the CSI reference signal comprises a plurality of symbol periods.

22. The apparatus of claim 21, wherein a density of the CSI reference signal is based at least in part on an interference measurement gap.

23. The apparatus of claim 18, wherein the instructions are operable to cause the apparatus to:
receive the CSI reference signal in a final transmission time interval (TTI) of a downlink (DL) burst.

24. The apparatus of claim 18, wherein the instructions are operable to cause the apparatus to:
receive the indication of the offset for CSI reference signals in radio resource control (RRC) signaling.

25. The apparatus of claim 18, wherein, to detect the signaling indicative of the transmission in the contention-based spectrum according to the TTI structure, the instructions are operable to cause the apparatus to:
detect, in the contention-based spectrum, a preamble of the transmission in the contention-based spectrum according to the TTI structure.

26. An apparatus for wireless communication, comprising:
a processor;
memory in electronic communication with the processor; and
instructions stored in the memory and operable, when executed by the processor, to cause the apparatus to:
transmit an indication of an offset for channel state information (CSI) reference signals within a transmission time interval (TTI) structure, the offset representing a relative location for the CSI reference signals within the TTI structure;
determine, after transmitting the indication of the offset, that a contention-based spectrum is available for transmission;
transmit, based at least in part on the determining and after transmitting the indication of the offset, signaling indicative of a transmission according to the TTI structure in the contention-based spectrum;

transmit, in the transmission according to the TTI structure, a CSI reference signal in the contention-based spectrum at the relative location within the TTI structure identified by the indicated offset; and receive a report comprising a channel quality indicator (CQI) computed based at least in part on the transmitted CSI reference signal and an indicator indicating that the CQI is based at least in part on the transmitted CSI reference signal.

27. The apparatus of claim 26, wherein the instructions are operable to cause the apparatus to:

identify a user equipment (UE) configured for CSI reference signal based CQI reporting, wherein the signaling is transmitted in the contention-based spectrum based at least in part on identifying the UE.

28. The apparatus of claim 26, wherein the instructions are operable to cause the apparatus to:

determine that the CQI was computed using the CSI reference signal based at least in part on transmitting the CSI reference signal in the contention-based spectrum.

29. The apparatus of claim 26, wherein the instructions are operable to cause the apparatus to:

determine that the CQI was computed using the CSI reference signal based at least in part on the indicator indicating that the CQI is based at least in part on the transmitted CSI reference signal.

* * * * *